United States Patent
Kato

(10) Patent No.: US 6,928,563 B2
(45) Date of Patent: Aug. 9, 2005

(54) SYSTEM FOR CONTROLLING POWER SUPPLIES OF A DEVICE CONNECTED TO A NETWORK DEPENDS ON COMMUNICATION MODE

(75) Inventor: Junji Kato, Tokyo (JP)

(73) Assignee: Sony Corporation (JP)

( * ) Notice: Subject to any disclaimer, the term of this patent is extended or adjusted under 35 U.S.C. 154(b) by 829 days.

(21) Appl. No.: 09/870,047

(22) Filed: May 30, 2001

(65) Prior Publication Data

US 2002/0110145 A1 Aug. 15, 2002

(30) Foreign Application Priority Data

Jun. 20, 2000 (JP) .................................... P2000-185048

(51) Int. Cl.⁷ ............................................... G06F 1/26
(52) U.S. Cl. .................... 713/320; 713/321; 713/323; 713/324
(58) Field of Search ................................ 713/300, 320, 713/321, 323, 324, 310; 370/298, 318; 375/295, 316, 370

(56) References Cited

U.S. PATENT DOCUMENTS 6,240,521 B1 * 5/2001 Barber et al. ............... 713/323
6,457,131 B2 * 9/2002 Kuemerle ................... 713/300
6,721,355 B1 * 4/2004 McClennon et al. ........ 375/222

* cited by examiner

Primary Examiner—Thuan Du
(74) Attorney, Agent, or Firm—Lerner, David, Littenberg, Krumholz & Mentlik, LLP

(57) ABSTRACT

Required power consumption is reduced for communication between communication devices connected to a network by an IEEE 1394 bus line. When the network includes communication in a synchronous communication mode and communication in an asynchronous communication mode, a power supply for a communication process in the synchronous communication mode is controlled independently of a power supply for executing a communication process in the asynchronous communication mode. Similarly, the power supply for executing the communication process in the asynchronous communication mode is controlled independently of the power supply for executing the communication process in the synchronous communication mode.

23 Claims, 19 Drawing Sheets

FIG. 6

| Offset | Name | Operation |
|---|---|---|
| 000h | State_Clear | State And Control Information |
| 004h | State_Set | Set State_Clear Bit |
| 008h | Node_IDs | Represent 16_Bit Node ID |
| 00Ch | Reset_Start | Start Command Reset |
| 018-01Ch | Split_Timeout | Regulate Maximum Time of Split |
| 200h | Cycle_Time | Cycle Time |
| 210h | Busy_Timeout | Regulate Limit of Retry |
| 21Ch | Bus_Manager | Represent ID of Bus Manager |
| 220h | Bandwidth_Available | Represent Band Which Can be Allocated to Isochronous Communication |
| 224h-228h | Channels_Available | Represent Using States of Channels |

FIG. 7

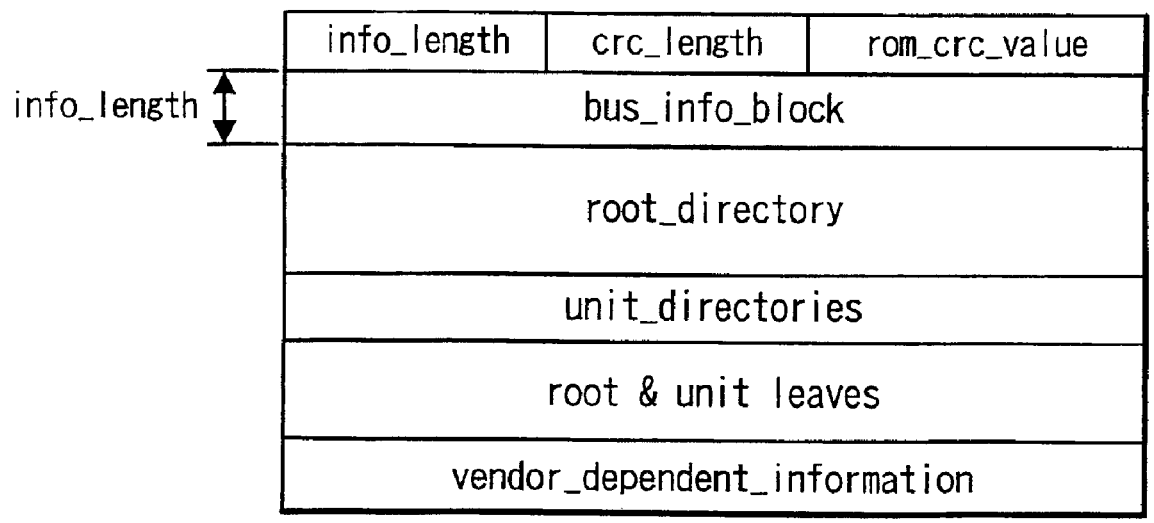

FIG. 9

| | |
|---|---|
| 900h | Output Master Plug Register |
| 904h | Output Plug Control Register #0 |
| 908h | Output Plug Control Register #1 |
| ⋮ | ⋮ |
| 97Ch | Output Plug Control Register #30 |
| 980h | Input Master Plug Register |
| 984h | Input Plug Control Register #0 |
| 988h | Input Plug Control Register #1 |
| ⋮ | ⋮ |
| 9FCh | Input Plug Control Register #30 |

FIG. 10A oMPR

| data rate capacity | broadcast channel base | non-persistent extention field | persistent extention field | reserved | number of output plugs |
|---|---|---|---|---|---|
| 2 | 6 | 8 | 8 | 3 | 5 (bit) |

FIG. 10B oPCR [n]

| on-line | broadcast connection counter | point-to-point connection counter | reserved | channel number | data rate | overhead ID | payload |
|---|---|---|---|---|---|---|---|
| 1 | 6 | 6 | 2 | 6 | 2 | 4 | 10 (bit) |

FIG. 10C iMPR

| data rate capability | reserved | non-persistent extention field | persistent extention field | reserved | number of input plugs |
|---|---|---|---|---|---|
| 2 | 6 | 8 | 8 | 3 | 5 (bit) |

FIG. 10D iPCR [n]

| on-line | broadcast connection counter | point-to-point connection counter | reserved | channel number | reserved |
|---|---|---|---|---|---|
| 1 | 6 | 6 | 2 | 6 | 16 (bit) |

FIG. 13

| address | The General Subunit Identifier Descriptor |
|---|---|
| | contents |
| 00 00₁₆ | descriptor_length |
| 00 01₁₆ | |
| 00 02₁₆ | generation_ID |
| 00 03₁₆ | size_of_list_ID |
| 00 04₁₆ | size_of_object_ID |
| 00 05₁₆ | size_of_object_position |
| 00 06₁₆ | number_of_root_object_lists(n) |
| 00 07₁₆ | |
| 00 08₁₆ ⋮ | root_object_list_id_0 |
| ⋮ | ⋮ |
| ⋮ | root_object_list_id_n-1 |
| ⋮ | subunit_dependent_length |
| ⋮ | subunit_dependent_information |
| ⋮ | manufacturer_dependent_length |
| ⋮ | manufacturer_dependent_information |

FIG. 14

| generation_ID values ||
|---|---|
| generation_ID | meaning |
| $00_{16}$ | Data structures and command sets as specified in the AV/C General Specification, version 3.0 |
| all others | reserved for future specification |

FIG. 15

| List ID Value Assignment Ranges ||
|---|---|
| range of values | list definition |
| $0000_{16}$-$0FFF_{16}$ | reserved |
| $1000_{16}$-$3FFF_{16}$ | subunit-type dependent |
| $4000_{16}$-$FFFF_{16}$ | reserved |
| $1\,000_{16}$-max list ID value | subunit-type dependent |

FIG. 20A

| ctype/response | | |
|---|---|---|
| Command | 0000 | Control |
| | 0001 | Status |
| | 0010 | Specific Inquiry |
| | 0011 | Notify |
| | 0100 | General Inquiry |
| | 0101 | |
| | ~ | (reserved for future specification) |
| | 0111 | |
| Response | 1000 | Not Implemented |
| | 1001 | Accepted |
| | 1010 | Rejected |
| | 1011 | In Transition |
| | 1100 | Implemented/Stable |
| | 1101 | Changed |
| | 1110 | (reserved for future specification) |
| | 1111 | Interim |

FIG. 20B

| subunit_type | |
|---|---|
| 00000 | Video Monitor |
| ~ | (reserved) |
| 00011 | Disc recorder/Player |
| 00100 | Tape recorder/Player |
| 00101 | Tuner |
| 00111 | Video Camera |
| ~ | (reserved) |
| 11100 | Vendor unique |
| 11101 | reserved |
| 11110 | Subunit type extended to next byte |
| 11111 | Unit |

FIG. 20C

| opcode:Operation Code | |
|---|---|
| 00h | Vendor-Dependent |
| 50h | Search Mode |
| 51h | Time Code |
| 52h | ATN |
| 60h | Open MIC |
| 61h | Read MIC |
| 62h | Write MIC |
| C1h | Load Medium |
| C2h | Record |
| C3h | Play |
| C4h | Wind |
| ~ | ~ |

FIG. 21A

AV/C control    tape recorder/player    Play    Forward

| CTS= 0000 | ctype= 0000 | subunit type= 00100 | id= 000 | opcode= C3h | operand= 75h |
|---|---|---|---|---|---|

FIG. 21B

AV/C accepted    tape recorder/player    Play    Forward

| CTS= 0000 | response =1001 | subunit type= 00100 | id= 000 | opcode= C3h | operand= 75h |
|---|---|---|---|---|---|

ID

SYSTEM FOR CONTROLLING POWER SUPPLIES OF A DEVICE CONNECTED TO A NETWORK DEPENDS ON COMMUNICATION MODE

BACKGROUND OF THE INVENTION

The present invention relates to a control method applied to data transmission between devices connected through a network of IEEE (The Institute of Electrical and Electronics Engineers) 1394 bus lines or the like and a communication device to which the control method is applied.

AV devices transmit information to each other through a network using an IEEE 1394 serial data bus. When data transmission is performed through the bus, a synchronous communication mode is used when audio data or the like is transmitted in real time and an asynchronous communication mode is used when a static image, text data, a control command, or the like is reliably transmitted. Bands dedicated to the respective modes are used in transmission. In the IEEE 1394 scheme, the synchronous communication mode is called an isochronous communication mode, and the asynchronous communication mode is called an asynchronous communication mode.

In communication in the isochronous communication mode, a device set as an IRM (Isochronous Resource Manager) in a network manages a channel and a band. A device for executing communication in isochronous communication mode performs the process of obtaining a channel and a band for the IRM. The channel is a path for flowing isochronous data between a transmission side and a reception side. The band is in proportion to the size of a packet transmitted on one channel, and is in an amount that is inversely proportional to a transmission rate.

By using the obtained channel and band, isochronous data is transmitted between the connected devices. Devices are connected using known connection technology, including a point-to-point connection (called a PtoP connection) for connecting an output plug of one device and an input plug of another device, and a broadcast connection for performing transmission by using a channel for broadcast.

In communication in the asynchronous communication mode, an input plug and an output plug which are different from those in the isochronous communication mode are used, and communication is executed by a control process which is different from that in the isochronous communication mode.

A communication circuit included in a device connected to the IEEE 1394 bus line, as described above, has two communication modes having different communication forms. Since the communication circuit is designed such that communication in the isochronous communication mode and communication in the asynchronous communication mode can be executed, the communication circuit has the disadvantage of having a circuit configuration that has a relatively large scale and a relatively high power consumption.

In a device connected to the conventional IEEE 1394 bus line, the bus line has only two states. In one state communication through the bus line can be performed and in the other state communication through the bus line cannot be performed at all because the power supply of the device is in an OFF state or a standby state. Therefore, when the power supply of the device is turned on to set the device in a state in which communication can be performed, a communication circuit connected to the bus line is always operable to consume power for the communication process.

The communication process in the device connected to the IEEE 1394 bus line has been described above. However, a similar problem is posed in communication devices for various communication methods which can perform communication in a synchronous communication mode and in an asynchronous communication mode simultaneously.

SUMMARY OF THE INVENTION

It is an object of the present invention to reduce the power consumption required for communication in a communication device connected to a network of this type.

In a control device according to the first aspect of the present invention, a first power supply for executing a communication process in a synchronous communication mode is controlled independently of a second power supply for executing a communication process in an asynchronous communication mode.

According to the first aspect of the present invention, the first power supply for executing the communication process in the synchronous communication mode is independently controlled. For example, when synchronous communication need not be performed, the first power supply can be turned off.

In a control method according to the second aspect of the present invention, the second power supply for executing a communication process in an asynchronous communication mode is controlled independently of the first power supply for executing a communication process in a synchronous communication mode.

According to the second aspect of the present invention, the second power supply for executing the communication process in the asynchronous communication mode is independently controlled. For example, when asynchronous communication need not be performed, the second power supply can be turned off.

A communication device according to the third aspect of the present invention includes a first communication process unit for performing a communication process in a synchronous communication mode, a second communication process unit for performing a communication process in an asynchronous communication mode, an input/output unit for performing a process between the first and second communication process units and a network, and a control unit which controls the synchronous communication and the asynchronous communication and can independently control the first power supply of the first communication process unit.

According to the third aspect of the present invention, the first power supply of the first communication process unit for executing the communication process in the synchronous communication mode can be independently controlled by the control unit. For example, if the synchronous communication need not be performed, the power supply of the first communication process unit can be turned off.

A communication device according to the fourth aspect of the present invention includes a first communication process unit for performing a communication process in a synchronous communication mode, a second communication process unit for performing a communication process in an asynchronous communication mode, an input/output unit for performing a process between the first and second communication process units and a network, and a control unit which controls the synchronous communication and the asynchronous communication and can independently control the second power supply of the second communication process unit.

According to the fourth aspect of the present invention, the second power supply of the second communication process unit for executing the communication process in the asynchronous communication mode can be independently controlled by the control of the control unit. For example, if the asynchronous communication need not be performed, the power supply of the second communication process unit can be turned off.

BRIEF DESCRIPTION OF THE DRAWINGS

FIG. 6 is a diagram explaining examples of the position, name, and operation of a main CRS;

FIG. 7 is a diagram explaining an example of a general ROM format;

FIG. 9 is a diagram explaining an example of the configuration of a PCR;

FIGS. 10A to 10D are diagrams explaining examples of the configurations of oMPR, an oPCR, and iPCR;

FIG. 13 is a diagram explaining an example of the data format of the descriptor;

FIG. 14 is a diagram explaining an example of a generation ID in FIG. 13;

FIG. 15 is a diagram explaining an example of a list ID in FIG. 13;

FIGS. 20A to 20C are diagrams explaining concrete examples of AV/C commands;

FIGS. 21A and 21B are diagrams explaining concrete examples of a command and a response of an AV/C command;

DETAILED DESCRIPTION

An embodiment of the present invention will be described below with reference to the accompanying drawings.

Figure 1:
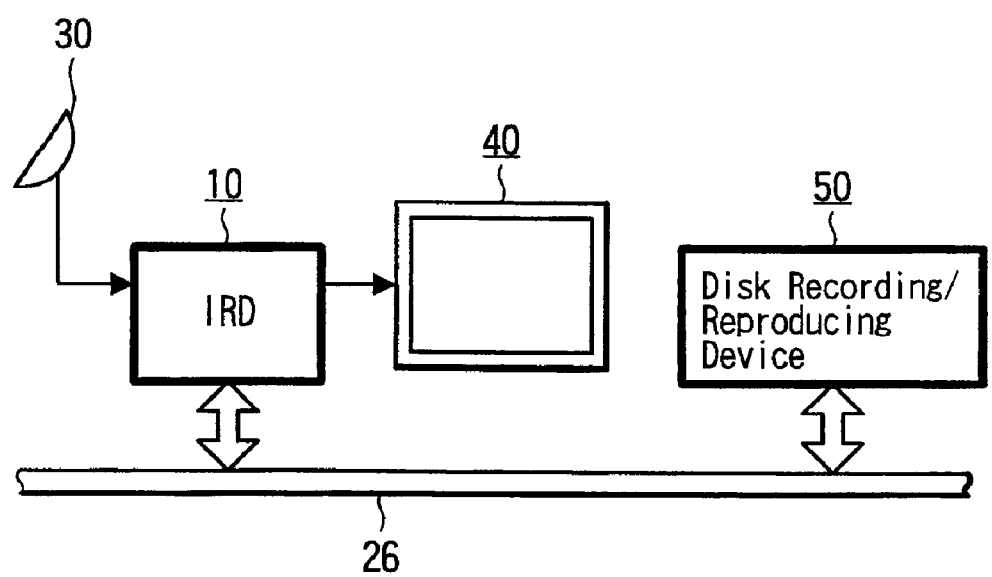
FIG. 1 is a block diagram showing an example of the configuration of an entire system according to an embodiment of the present invention.

An example of the configuration of a network system to which the present invention is applied will be described below with reference to FIG. 1. In this network system, a plurality of devices are connected through a cable 26 constituting an IEEE 1394 serial data bus. In this case, as shown in FIG. 1, an IRD (Integrated Receiver Decoder) 10 having a terminal for connecting an IEEE 1394 bus and a disk recording/reproducing device 50 are connected to the cable 26. The cable 26 corresponds to the IEEE 1394 bus line.

The IRD 10 is a digital satellite broadcast receiver, and is designed to process a channel input received through a connected antenna 30 and also to perform a demodulation process or the like of a broadcast signal of the received channel. In addition to a television broadcasting channel comprising a video signal and an audio signal, the received channel also can contain a radio broadcasting channel comprising an audio signal or a data broadcasting channel.

A television monitor 40 is connected to the IRD 10 through an analog cable. A program received by the IRD 10 can be viewed and heard with the monitor 40. The television monitor 40 may be connected to the cable 26 so that video data or the like may be transmitted to the television monitor 40 through the cable 26.

The disk recording/reproducing device 50 is a device which uses a photomagnetic disk called a mini disk (MD) or an optical disk as a recording medium to record and reproduce an audio signal or the like.

In FIG. 1, the network configuration shows only two devices connected to the cable 26 serving as a bus line. However, other devices can be connected to the cable 26 to obtain a larger network configuration.

Figure 2:
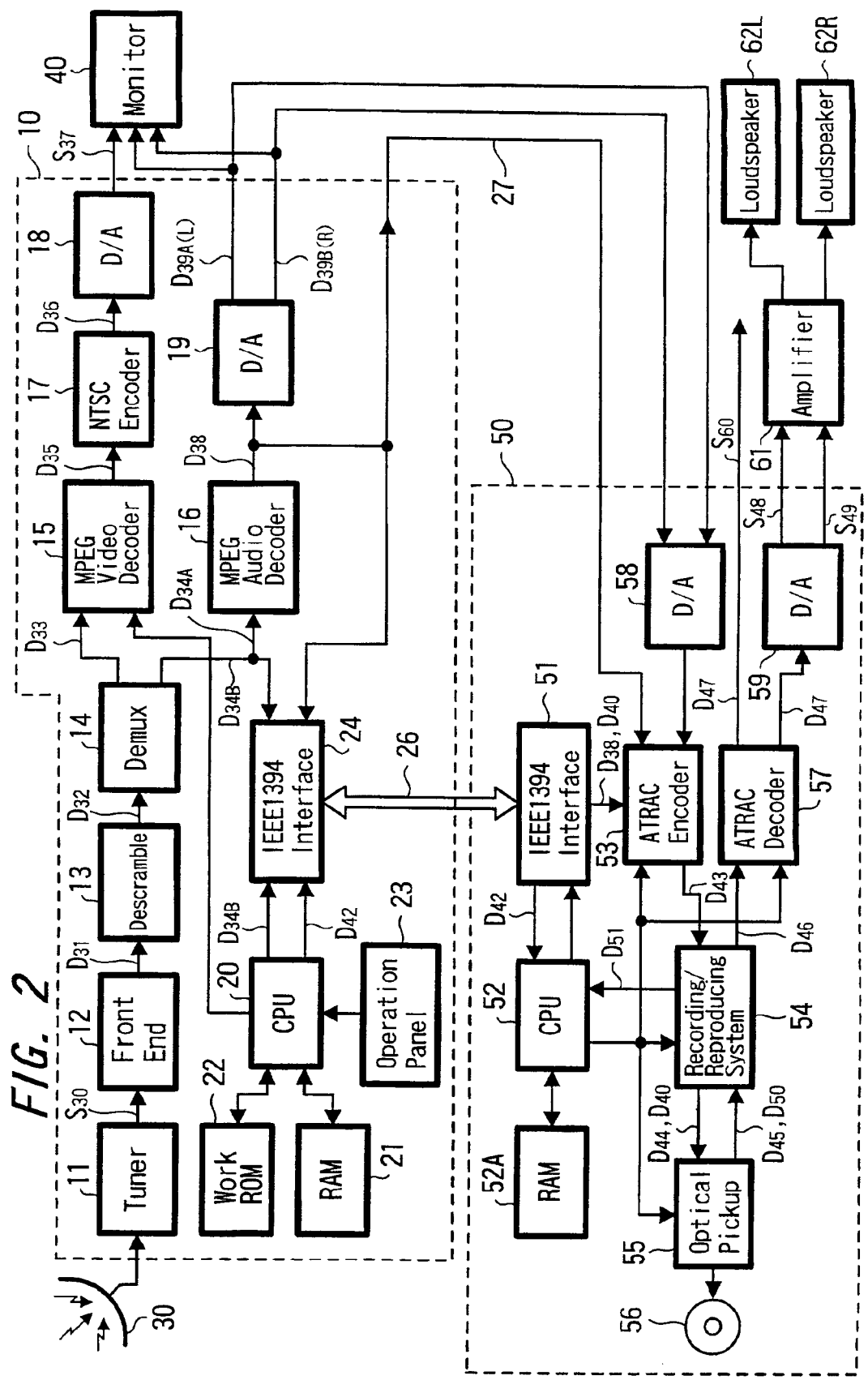
FIG. 2 is a block diagram showing an example of the internal configuration of an IRD and a disk recording/reproducing device according to an embodiment of the present invention.

FIG. 2 is a diagram showing the details of a configuration which receives a broadcast signal of a digital satellite broadcast system and records the broadcast signal. A broadcast radio wave from a satellite (not shown) is received by the antenna 30 and transmitted to a tuner 11 serving as a program selection means arranged in the IRD 10 serving as a program receiving device. The IRD 10 is designed such that respective circuits operate on the basis of the control of a CPU 20. A reception signal S30 from a transponder selected by the tuner 11 is transmitted to a front-end unit 12.

The front-end unit 12 demodulates the reception signal S30 and performs an error correction process to reception data obtained as a result of the demodulation. Thereafter, the reception data is transmitted to a descramble circuit 13 as a reception data stream D31.

The descramble circuit 13, on the basis of cryptograph key information of a contract channel stored in an IC card (not shown) inserted into the body of the IRD 10, extracts multiplexing data D32 of the contract channel from the reception data stream D31 to transmit the multiplexing data D32 to a demultiplexer 14.

The demultiplexer 14 rearranges the multiplexing data D32 in units of channels, extracts only a channel designated by a user, transmits a video stream D33 comprising the packet of a video portion to an MPEG video decoder 15, and transmits an overlap stream D34A comprising the packet of an audio portion to an MPEG audio decoder 16.

The MPEG video decoder 15 decodes the video stream D33 to recover video data D35 obtained before compression coding, and transmits the recovered video data D35 to an NTSC encoder 17. The NTSC encoder 17 converts the video data D35 into a luminance signal and a color difference signal of the NTSC system, and transmits the luminance signal and the color difference signal to a digital-analog conversion circuit 18 as NTSC data D36. The digital-analog conversion circuit 18 converts the NTSC data D36 into an analog signal S37 and outputs the analog signal S37 to the monitor 40.

The MPEG audio decoder 16 decodes the overlap stream D34A to recover a PCM (Pulse Code Modulation) audio data D38 obtained before compression coding, and transmits the PCM audio data D38 to a digital-analog conversion circuit 19. The PCM audio data D38 is supplied to an interface 24, and can be transmitted to the bus line 26. In addition, the PCM audio data D38 can be directly transmitted to the disk recording/reproducing device 50 through a cable 27 which is not a bus line.

The digital-analog conversion circuit 19 converts the PCM audio data D38 into an analog signal to generate an LCh audio signal S39A and an RCh audio signal S39B, outputs the LCh audio signal S39A and the RCh audio signal S39B as speech through a loudspeaker (not shown) of the monitor 40, and transmits the LCh audio signal S39A and the RCh audio signal S39B to an analog-digital conversion circuit 58 of the disk recording/reproducing device 50.

When a music channel of contract channels is designed, the demultiplexer 14 transmits the audio stream D34A of the multiplexing data D32 to the MPEG audio decoder 16 and outputs speech-added information stream D34B serving as added information comprising the packets of speech-added information to the CPU 20 through the IEEE 1394 interface 24.

The CPU 20 generates title data D40 from the packets of the speech-added information stream D34B expressed by characters, numbers, and the like on the basis of ID (Identification) numbers added to the packets.

At this time, the CPU 20, serving as a recording control means, generates recording control data D41 serving as a control signal for controlling a recording operation such as a recording start operation or a recording stop operation on the basis of a recording instruction input by a user through an operation button (not shown) on an operation panel 23, and returns the recording control data D41 and the title data D40 as control data D42 to the IEEE 1394 interface 24.

The IEEE 1394 interface 24 transmits the control data D42 supplied from the CPU 20 from the IEEE 1394 cable 26 serving as a data transmission/reception means to a CPU 52 through an IEEE 1394 interface 51 of the disk recording/reproducing device 50 serving as a data recording reproducing means, and transmits the PCM audio data D38 from the IEEE 1394 cable 26 to an ATRAC encoder 53 through the IEEE 1394 interface 51.

The ATRAC encoder 53 is highly efficient and codes the PCM audio data D38 by the ATRAC system on the basis of the control of the CPU 52, and transmits the coded data to a recording/reproducing system 54 as PCM audio data D43.

The CPU 52 of the disk recording/reproducing device 50 is designed to control recording operations of a recording/reproducing system 54 and an optical pickup 55 on the basis of the recording control data D41 of the control data D42. Adding an error correction code and a predetermined modulation process to the PCM audio data D43 are performed by the recording/reproducing system 54. Thereafter, the PCM audio data D43 is recorded as recording data D44 in a designated region of a photomagnetic disk 56 serving as a recording medium through the optical pickup 55.

The CPU 52 of the disk recording/reproducing device 50 controls recording operations of the recording/reproducing system 54 and the optical pickup 55 on the basis of the recording control data D41, so that, of the title data D40, data expressed by half-size katakana and alphanumerical characters is recorded as kana alphanumerical code title data D40A in a predetermined area of the photomagnetic disk 56, and records data expressed by full-size kanji and hiragana characters as kanji code title data D40B in a predetermined area.

In this manner, the IRD 10 controls the recording operation of the disk recording/reproducing device so by the CPU 20 so that the PCM audio data D38 can be recorded in a predetermined region of the photomagnetic disk 56 and to record the title data D40 corresponding to the PCM audio data D38 to be recorded in a predetermined area (TOC area) of the photomagnetic disk 56.

In reproduction, the disk recording/reproducing device 50 transmits reproduced data D45 reproduced by the optical pickup 55 to the recording/reproducing system 54. The recording/reproducing system 54 performs an error correction process and a predetermined demodulation process to the reproduced data D45 and transmits the reproduced data D45 to an ATRAC decoder 57 as reproduced data D46.

The ATRAC decoder 57 decodes the reproduced data D46 by the ATRAC system. The ATRAC decoder 57 externally outputs the decoded data D46 as digital reproduced data D47 through an optical digital cable 60 or converts the decoded data D46 into an analog LCh audio signal S48 and an analog RCh audio signal S49 to output the LCh audio signal S48 and the RCh audio signal S49 as speech from loudspeakers 62L and 62R connected to an amplification device 61.

The disk recording/reproducing device 50 reads title data DS0 corresponding to the reproduced data D45, which is being reproduced, from the TOC 1 area or the TOC 4 area of the photomagnetic disk 56 by the optical pickup 55 and transmits the title data DS0 to the recording/reproducing system 54. The recording/reproducing system 54 performs an error correction process and a predetermined demodulation process to the title data D50 and then transmits the processed title data D50 as title data D51 to the CPU 52.

The CPU 52 stores the title data DS1 in a RAM 52A and transmits the title data D51 to a RAM 21 through the IEEE 1394 interface S1, the IEEE 1394 cable 26, the IEEE 1394 interface 24, and the CPU 20 to store the title data D51 in the RAM 21 serving as a storage means.

In this state, when instruction information for displaying image data corresponding to the title data DS1 on the monitor 40 is input through an operation panel 46, the CPU 20 serving as a display control means reads title data DS2 from the RAM 21 and transmits the title data D52 to the MPEG video decoder 15. The MPEG video decoder 15 performs a predetermined graphics process to the title data D52, and transmits the resultant image data to the monitor 40 through the NTSC encoder 17 and the digital-analog conversion circuit to display a GUI (Graphic User Interface) screen on the monitor 40 serving as the display means.

In reproduction from the disk, the reproduced audio data or the like may be transmitted from the IEEE 1394 interface 51 to another device through the cable 26.

Communication of the above-described devices (in this case, the IRD 10 and the disk recording/reproducing device 50) connected to the cable 26, serving as an IEEE 1394 bus line, through the bus line of the devices will be described below with reference to FIG. 3.

Figure 3:
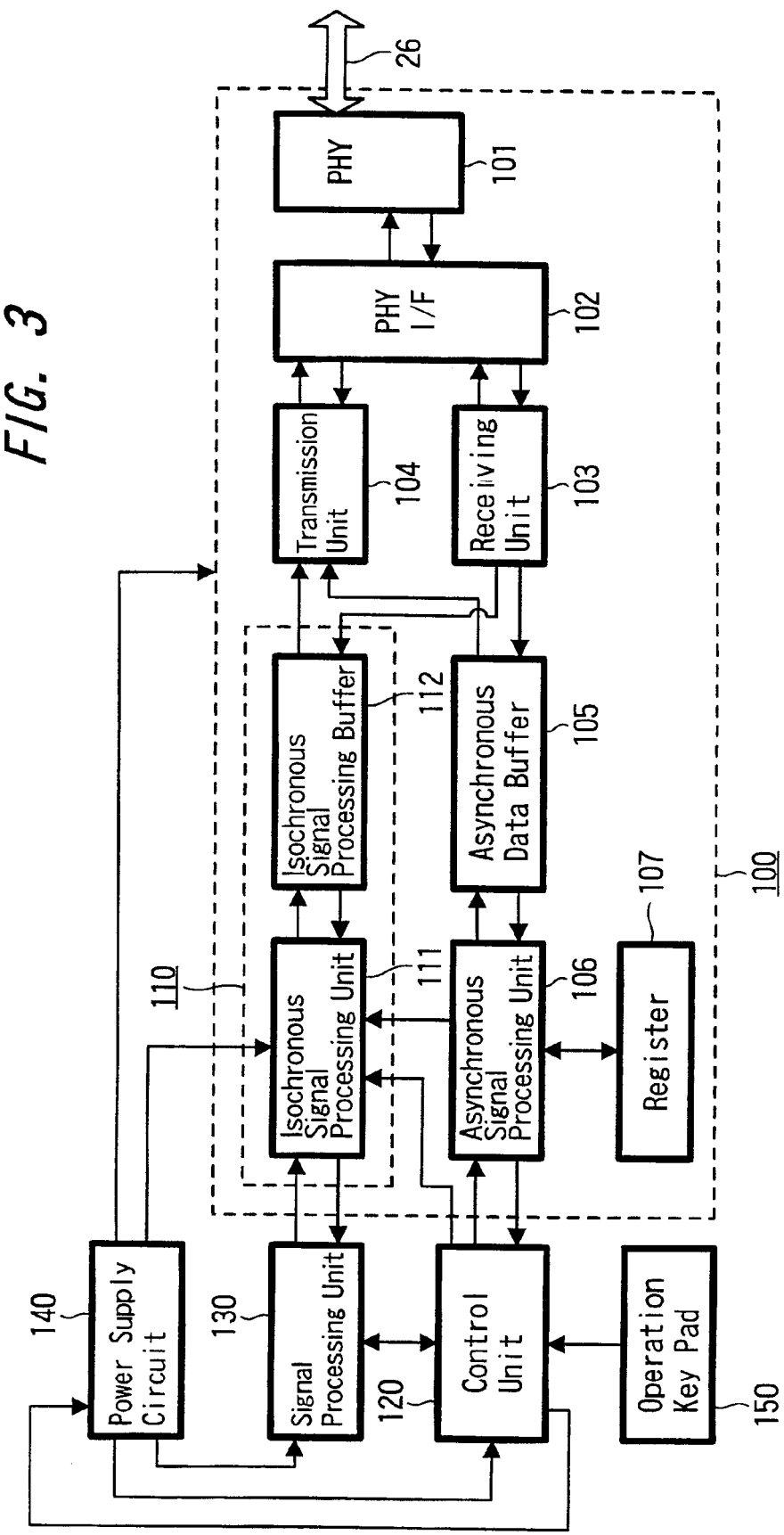
FIG. 3 is a block diagram showing an example of the configuration of a communication process unit according to an embodiment of the present invention.

In FIG. 3, a communication process block 100 is a processing block for performing communication with another device through the cable 26. This communication process block 100 corresponds to the IEEE 1394 interface 24 when the IRD 10 is used, and corresponds to the IEEE 1394 interface 51 when the disk recording/reproducing device 50 is used. A communication process in the communication process block 100 is executed by control unit 120. This control unit 120 corresponds to the CPU 20 when the IRD 10 is used, and corresponds to the CPU 52 when the disk recording/reproducing device 50 is used. In addition, a process for stream data transmitted by the communication process block 100 or a process for received stream data are executed by a signal processing unit 130. This signal processing unit 130 corresponds to a block for receiving broadcast data when the IRD 10 is used, and corresponds to a block for recording stream data on a disk and reproducing the stream data when the disk recording/reproducing device 50 is used.

In FIG. 3, a power supply circuit 140 for supplying power to these blocks is shown. Control unit 120 controls the supply state of the power supply from the power supply circuit 140. In particular, a power supply to an isochronous block 110 (to be described later) can be controlled independently of a power supply to another block. The details of the power supply process will be described later. In addition, an operation key pad 150 for setting the operation states of the devices is connected to the control unit 120. This operation key pad 150 comprises, for example, the operation panel 23 in the IRD 10 shown in FIG. 2.

The configuration of the communication process block 100 for performing communication with an IEEE 1394 bus line will be described below. A physical layer (PHY layer) 101 is an input/output unit of communication process block 100 and is directly connected to the cable 26. Physical layer 101 performs an input process from the bus line and an output process to the bus line.

A reception unit 103 and a transmission unit 104 are connected to the physical layer 101 through a physical layer interface unit 102. Transmission in the IEEE 1394 bus line 26 can be in isochronous and asynchronous communication modes. In isochronous communication mode, stream data is synchronously communicated. In asynchronous communication mode, control data is asynchronously communicated. In the reception unit 103 and the transmission unit 104, the processes of both communication modes can be performed. More specifically, data transmitted through the bus line in isochronous communication mode, that is destined for receipt in the reception unit 103 is received in the isochronous communication mode, and then is supplied to an isochronous data buffer 112 in the isochronous block 110. Data received in the asynchronous communication mode is supplied to an asynchronous data buffer 105. The transmission unit 104 processes the transmitted data supplied from the isochronous data buffer 112 in the isochronous communication mode in the isochronous block 110, and processes the transmitted data supplied from the asynchronous data buffer 105 in the asynchronous communication mode.

The isochronous block 110 comprises an isochronous signal processing unit 111 and an isochronous data buffer 112. Isochronous data in units of received packets is supplied to the isochronous signal processing unit 111 through the buffer 112, and continuous stream data is obtained on the basis of a time stamp added to the data. The obtained stream data is supplied to the signal processing unit 130. The stream data is then divided by the isochronous signal processing unit 111 into isochronous data in units of packets, and time stamps are added to the data of the respective packets. The packets of isochronous data are transmitted to the transmission unit 104 through the buffer 112. The isochronous signal processing unit 111, the reception unit 103, and the transmission unit 104 control the timing of the data input to or output from the isochronous data buffer 112.

In this embodiment, the isochronous signal processing unit 111 and the buffer 112 in the isochronous block 110 are designed such that the power supplies of the isochronous signal processing unit 111 and the buffer 112 are controlled independently of the other circuits in the communication process block 100. More specifically, when power is supplied to the other circuits in the communication process block 100, the power supply to the isochronous block 110 can be stopped.

An asynchronous signal processing unit 106 is connected to the asynchronous data buffer 105. Data (asynchronous packet) received in the asynchronous communication mode is processed by the asynchronous signal processing unit 106, and is supplied to the control unit 120 if necessary. Data (asynchronous packet) transmitted from the asynchronous signal processing unit 106 is supplied to the transmission unit 104 through the buffer 105. A register 107 for managing communication is connected to the asynchronous signal processing unit 106. From the received data, data is written in the register 107, and a response to the data read from the register 107 is performed. The configuration of the register 107 will be explained in the description of a communication process configuration of the IEEE 1394 system.

However, by using a partial storage area, a plug control register is prepared for virtually setting plugs in the respective communication modes. When isochronous communication is performed by the isochronous block 110, reading and writing of the plug control register are performed in the asynchronous communication mode to extend connection and to perform communication.

Control unit 120 determines the value of the plug control register in the register 107.

Figure 4:
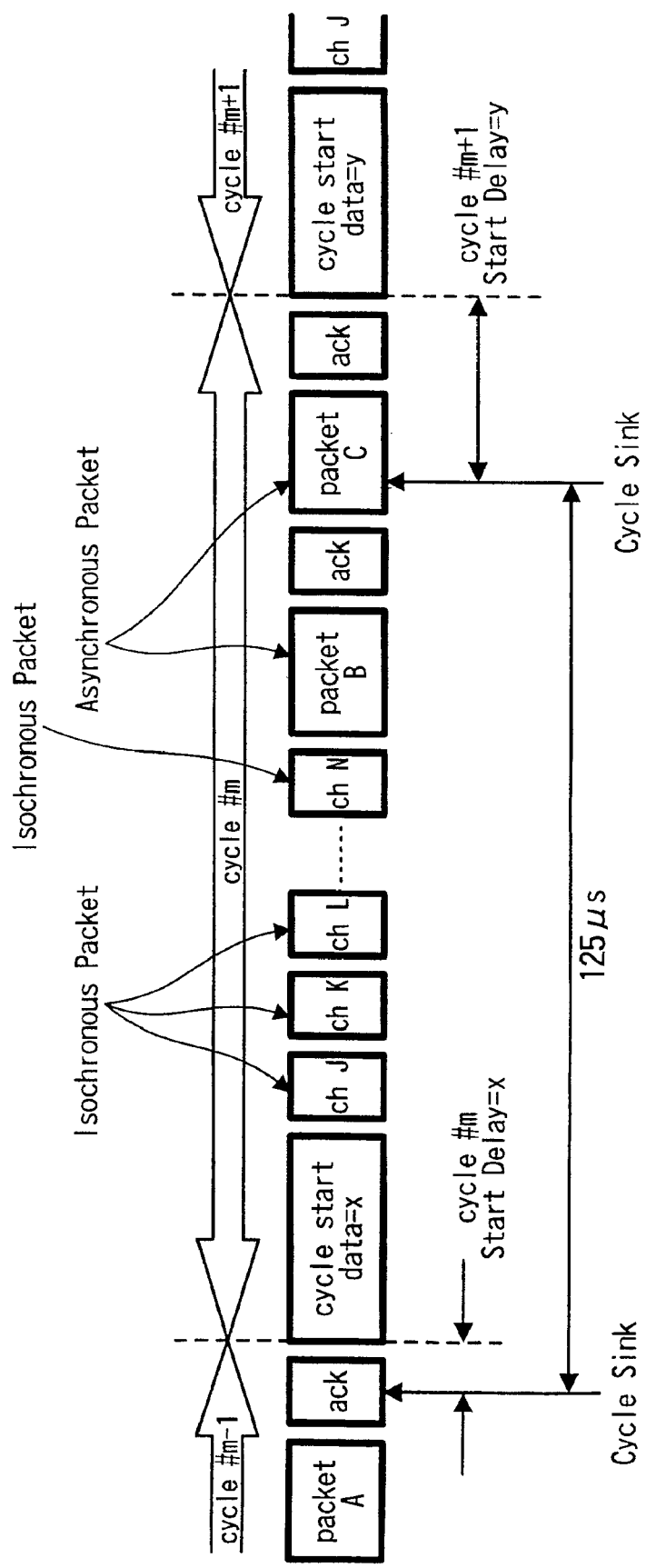
FIG. 4 is a diagram explaining an example of the cycle structure of data transmission on an IEEE 1394 bus.

A communication state in an IEEE 1394 bus line and a process configuration required for the communication will be described below. FIG. 4 is a diagram showing the cycle structure of data transmission of devices connected by the IEEE 1394 bus line. In the IEEE 1394 bus line, data is divided into packets, and the packets are time-division transmitted with reference to a cycle having a length of 125 $\mu$S. This cycle is started made by a cycle start signal supplied from a node (one of the devices connected to the bus) having a cycle master function. An isochronous packet secures a band (although the band is a time unit) required for transmission from the start of all the cycles. Thus, in isochronous transmission, transmission of data within a predetermined period of time is assured. However, if a transmission error is generated, a protecting device is not present, and data is lost.

During a period of time that is not used for isochronous transmission of each cycle, a node secures a bus as a result of arbitration and transmits an asynchronous packet in the asynchronous transmission. By using acknowledge and retry commands, reliable transmission of the asynchronous packets is assured, but the transmission timing is not constant.

In order to cause a predetermined node to perform isochronous transmission, the node must correspond to an isochronous function. At least one of the nodes corresponding to the isochronous function must have a cycle master function. In addition, at least one of the nodes connected to the IEEE 1394 serial bus must have the function of isochronous resource manager.

Figure 5:
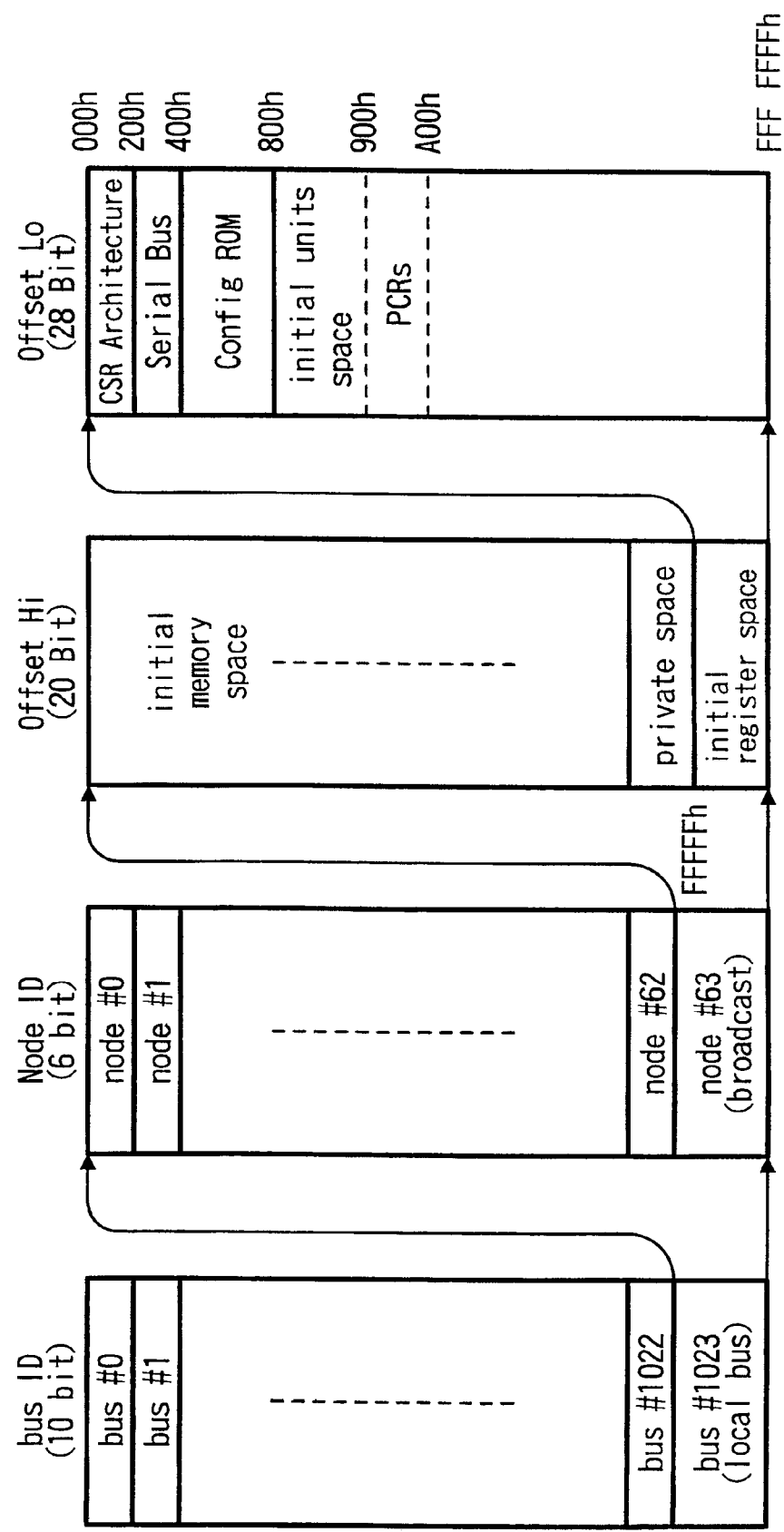
FIG. 5 is a diagram explaining an example of the structure of an address space of a CRS architecture.

The IEEE 1394 conforms to a CSR (Control & Status Register) architecture having a 64-bit address space regulated by ISO/IEC 13213. FIG. 5 is a diagram explaining the structure of the address space of the CSR architecture. This data is registered and set in the register 107 shown in FIG. 3. The upper 16 bits correspond to a node ID representing a node on each IEEE 1394 bus line, and the remaining 48 bits are used to designate an address space given to each node. The upper 16 bits are divided into 10 bits for a bus ID and 6 bits for a physical ID (which strictly means a node ID). Since the value at which each of the bits is 1 is used for a special purpose, 1023 buses and 63 nodes can be designated.

An address space regulated by the lower 48 bits is divided into a space regulated by the upper 20 bits and a space regulated by the lower 28 bits. The space regulated by the upper 20 bits is divided into an initial register space (Initial Register Space) that is used in a register inherent in a 2048-byte CSR, the IEEE 1394, or the like, a private space (Private Space), and an initial memory space (Initial Memory Space) and the like. The space regulated by the lower 28 bits is divided into a space used as a configuration ROM (Configuration ROM), an initial unit space (Initial Unit Space) used for a purpose inherent in a node, a plug control register (Plug Control Register (PCRs), or the like.

FIG. 6 is a diagram explaining offset addresses, names, and operations of a main CSR. In FIG. 6, an offset represents an offset address starting from number FFFFF0000000h (a number having h at the end represents a number in hexadecimal notation) at which an initial register space is started. A bandwidth available register (Bandwidth Available Register) having an offset address of 220h represents a band which can be allocated to isochronous communication, and only the value of a node operated as an isochronous resource manager (IRM) is made effective. More specifically, although the CSR in FIG. 5 is included in each node, a bandwidth available register of only the isochronous resource manager is made effective. In other words, the bandwidth available register is substantially included in only the isochronous resource manager. The maximum value is stored in the bandwidth available register when no band is allocated to the isochronous communication, and the value decreases each time a band is allocated to the isochronous communication.

A channels available register (Channels Available Register) having an offset address from 224h to 228h has bits corresponding to channel numbers 0 to 63. A bit of 0 represents that the channel has been allocated. Only the channels available register of a node operating as an isochronous resource manager is effective.

Returning to FIG. 5, configuration ROMs based on a general ROM format are arranged at addresses 400h to 800h in the initial register space. FIG. 7 is a diagram for explaining the general ROM format. A node serving as a unit of access on the IEEE 1394 bus can have a plurality of units which independently operate while commonly using an address space. Unit directories can indicate the versions and positions of portions of software corresponding to the units. Although the positions of a bus information block (bus info block) and a root directory are fixed, the positions of other blocks are designated by offset addresses.

Figure 8:
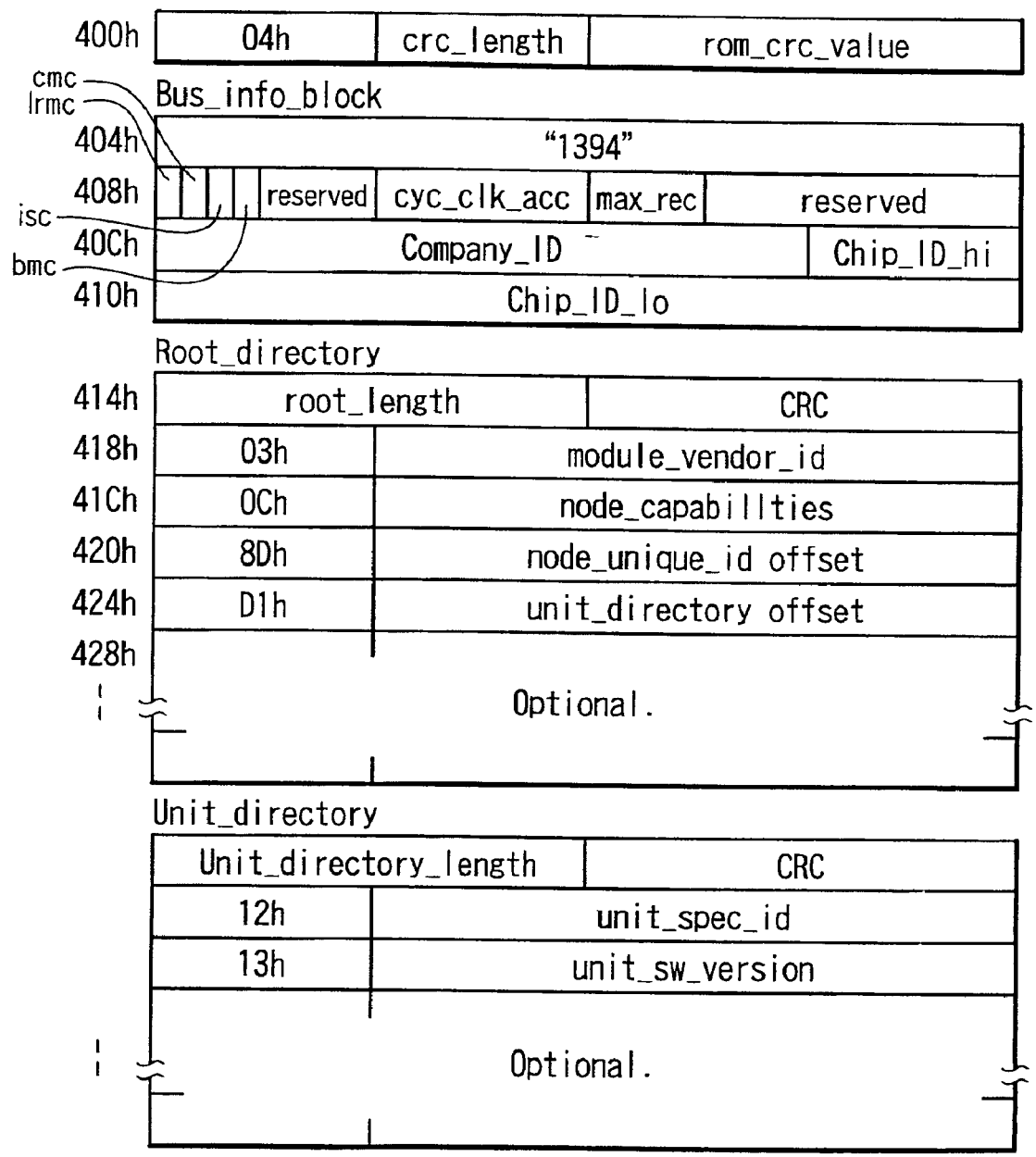
FIG. 8 is a diagram explaining examples of a bus info block, a root directory, and a unit directory.

FIG. 8 is a diagram showing the details of a bus info block, a root directory, and a unit directory. In Company ID in the bus info block, an identification (ID) number is stored representing a manufacturer of a device. Chip ID is a unique ID that is not equal to the IDs of other devices. In addition, according to the standards of IEC 61833, in the unit spec ID of the unit directory of a device which satisfies the IEC 61883 standards, 00h, Aoh, and 2Dh are written in the first octet, the second octet, and the third octet, respectively. Furthermore, 01h is written in the first octet of a unit switch version (unit sw version), and 1 is written in the LSB (Least Significant Bit) of the third octet.

Since input/output operations of a device are controlled through an interface, a node has a PCR (Plug Control Register) regulated by the IEC 61883 standards at addresses 900h to 9FFh in the initial unit space in FIG. 5. In this case, in order to form a signal path logically similar to an analog interface, a plug is virtually created by a register.

FIG. 9 is a diagram explaining the configuration of the PCR. The PCR has an oPCR (output Plug Control Register) representing an output plug and an iPCR (input Plug Control Register) representing an input plug. The PCR also has a register oMPR (output Master Plug Register) and an iMPR (input Master Plug Register) representing an output plug or an input plug inherent in each device. Each device does not have a plurality of oMPRs and a plurality of iPCRs, but each device can have a plurality of oPCRs and a plurality of iPCRs corresponding to each plug depending on the capability of the device. The PCR shown in FIG. 9 has 31 oPCRs and 31 iPCRs. A flow of isochronous data is controlled by operating registers corresponding to these plugs.

FIGS. 10A to 10D are diagrams showing the configurations of an oMPR, an oPCR, an iMPR, and an iPCR. FIG. 10A shows the configuration of the oMPR, and FIG. 10B shows the configuration of the oPCR. FIG. 10C shows the configuration of the iMPR, and FIG. 10D shows the configuration of the iPCR. In the 2-bit data rate capacity position on the Most Significant Bit (MSB) side of the oMPR and the iMPR, a code is stored representing the maximum transmission rate of isochronous data which can be transmitted and received by the device. The broadcast channel base of the oMPR regulates the number of a channel used in a broadcast output.

In the 5-bit number of output plugs position on the LSB side of the oMPR, a value is stored representing the number of oPCRs, or output plugs, included in the device. In the 5-bit number of input plugs position on the LSB side of the iMPR, a value is stored representing the number of iPCRs, or input plugs, included in the device. In the oMPR and the iMPR, a non-persistent extension field and a persistent extension field are regions defined for future expansion.

The on-line fields of the MSBs of the oPCR and iPCR represent use states of the plugs. More specifically, a value of 1 represents an on-line plug, and a value of 0 represents an off-line plug. The on-line plug represents a state in which transmission can be performed by using the plug. The off-line plug represents a state in which transmission cannot be performed by using the plug. The values of the broadcast connection counter (bcc) of the oPCR and the iPCR are 1 when a broadcast connection is extended. The values are 0 when a broadcast connection is not extended.

Values of a point-to-point connection counter (pcc) having a 6-bit width of the oPCR and the iPCR represent states of a point-to-point connection included in the plug. The value of the point-to-point connection counter is any one of values of 1 to 63 when a PtoP connection is extended. The value is 0 when the PtoP connection is not extended. Therefore, a state in which each of the 7 bits of the broadcast connection counter and the point-to-point connection counter are 0 represents a state in which a connection is not extended to the corresponding plug. A state in which at least one bit of the 7 bits is 1 represents a state in which a connection is extended to the plug.

Values of channel numbers, each having a 6-bit width, of the oPCR and the iPCR represent the numbers of isochronous channels to which the plug is connected. An actual transmission rate of a packet of isochronous data output from the plug is represented by the value of a data rate of the oPCR having a 2-bit width. Three types of transmission rates, for example, 100 Mbps (S100 mode), 200 Mbps (S200 mode), and 400 Mbps (S400 mode) are prepared. The transmission rate represented by the value of the data rate is selected from the three types of transmission rates and by the transmission rate of the connection obtained at that time. The oPCR has a code stored in an overhead ID having a 4-bit width that is a value obtained from the propagation delay in isochronous communication occurring when stream data is transmitted. The oPCR also has a payload having a value with 10-bit width representing the size of stream data transmitted by the plug in a quadlet unit.

Figure 11:
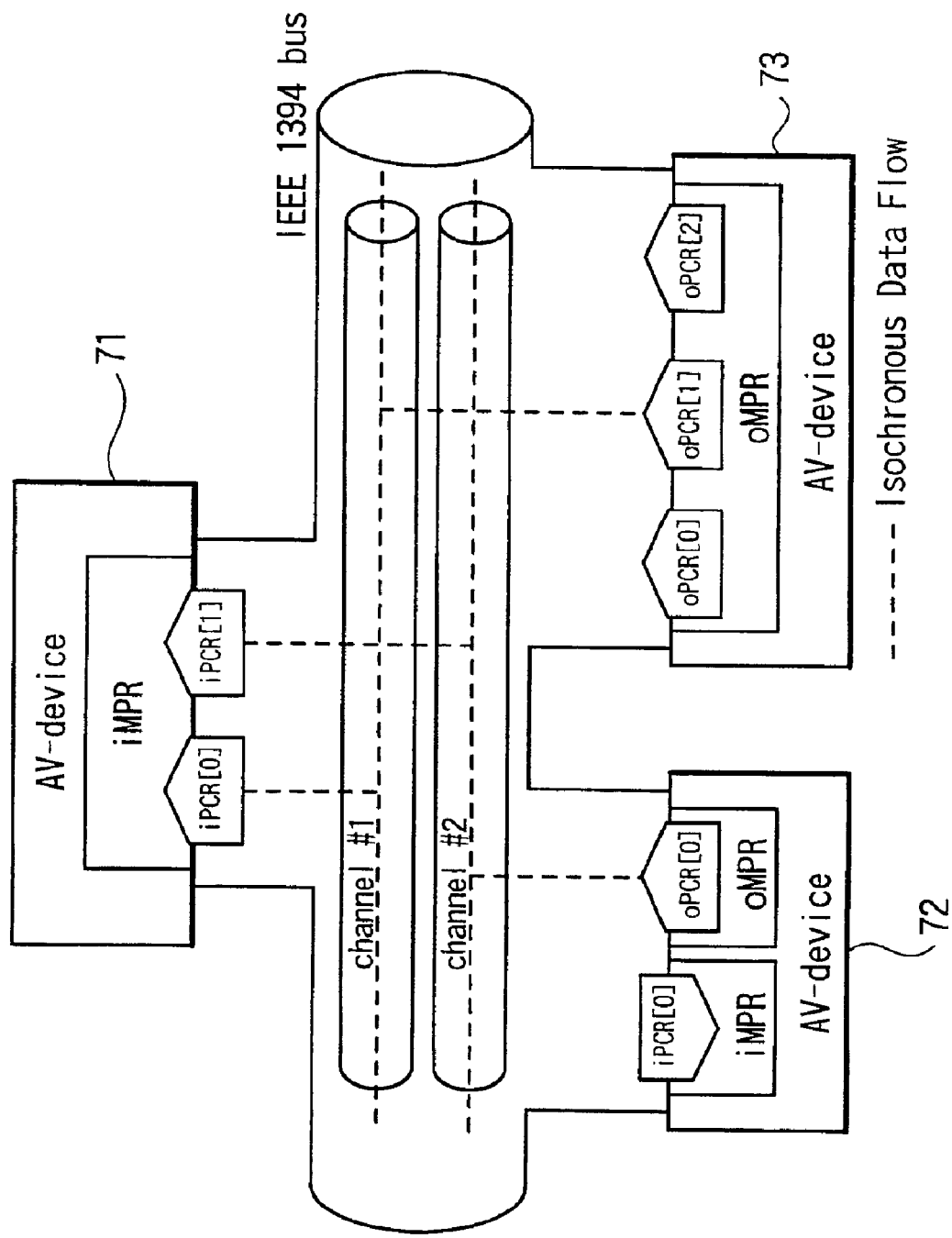
FIG. 11 is a diagram explaining an example of the relationship among a plug, a plug control register, and a transmission channel.

FIG. 11 is diagram showing the relationship between a plug, a plug control register, and an isochronous channel. The AV devices 71 to 73 are connected to each other through an IEEE 1394 serial bus. The oMPR of AV device 73 regulates the transmission rates of oPCR [0] to oPCR [2]. oPCR [1] of AV device 73 designates a channel for transmission of isochronous data to a channel #1 of the IEEE 1394 serial bus. The iMPR of AV device 71 regulates the transmission rates of an iPCR [0] and an iPCR [1]. The iPCR [0] of AV device 71 designates the input channel #1 of the IEEE 1394 serial bus, and the AV device 71 reads the isochronous data transmitted to the channel #1. Similarly, the oPCR [0] of the AV device 72 designates a channel #2 of the IEEE 1394 serial bus, and AV device 72 transmits isochronous data to channel #2. The iPRC [1] of AV device 71 designates the channel #2 of the IEEE 1394 serial bus and reads the isochronous data from the channel #2.

In this manner, data transmission is performed between devices connected to each other through an IEEE 1394 serial bus.

In the system of this embodiment, an AV/C command set is used to control the devices connected to each other through the IEEE 1394 serial bus.

Figure 12:
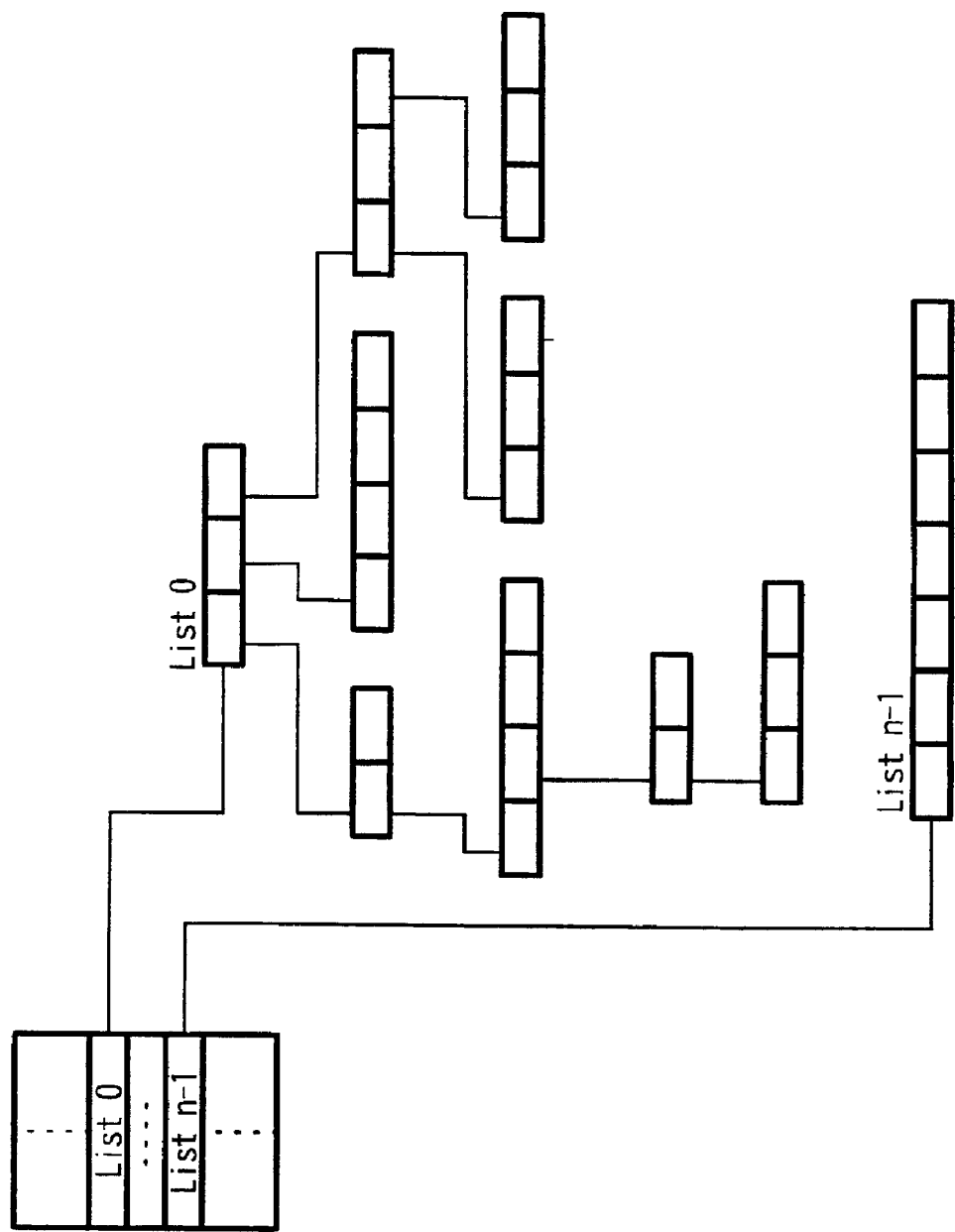
FIG. 12 is a diagram explaining an example of the data structure obtained by the hierarchical structure of a descriptor.

When various information is recorded by the system according to this embodiment, the data structure of a Subunit Identifier Descriptor is used and will be described below with reference to FIGS. 12 to 15. FIG. 12 shows the data structure of a Subunit Identifier Descriptor. As shown in FIG. 12, the data structure of a Subunit Identifier Descriptor comprises a hierarchical structure. When a tuner is used, the list indicates a receivable channel, and, when a disk is used, the list indicates the names of songs recorded on the disk. The list of the upper layer of the hierarchical structure is called a root list. For example, list 0 is a root corresponding to the lower list of the upper layer. Similarly, lists 2 to (n−1) are root lists.

The number of root lists is equal to the number of objects.

Here, when an AV device is a tuner, the object indicates each channel or the like in digital broadcast. All of the lists of one layer share common information.

FIG. 13 shows the format of a General Subunit Identifier Descriptor. In the General Subunit Identifier Descriptor, the contents describe subsidiary information related to a function. The value of a descriptor length field itself is not included. A generation ID represents the version of an AV/C command set. The present value of the generation ID is "00h" (h represents hexadecimal notation) as shown in FIG. 14. Here, "00h" means that the data structures and command sets are specified in version 3.0 of the AV/C general specification. As shown in FIG. 14, all of the values except for "00h" are preserved and secured for future specifications.

A size of list ID represents the number of bytes of a list ID. A size of object ID represents the number of an object ID. The size of object position represents a position (the number of bytes) in a list that is used in performing control.

A number of root object lists represents the number of root object lists. A root object list id represents an ID for identifying the root object list of the upper layer of the independent layers.

A subunit dependent length represents the number of bytes of a subsequent subunit dependent information field. The subunit dependent information field represents information inherent in a function. A manufacturer dependent length represents the number of bytes of a subsequent manufacturer dependent information field. The manufacturer dependent information field represents specification information of a vender (maker). When no manufacturer dependent information is included in a descriptor, the field does not exist.

FIG. 15 shows an allocation range of the list ID shown in FIG. 13. As shown in FIG. 15, "0000h" to "0FFFh" and "4000h to FFFFh" are secured and reserved as an allocation range for future specifications. "1000h to 3FFFh" and "10000h to max list ID value" identify subsidiary information of a function type.

Figure 16:
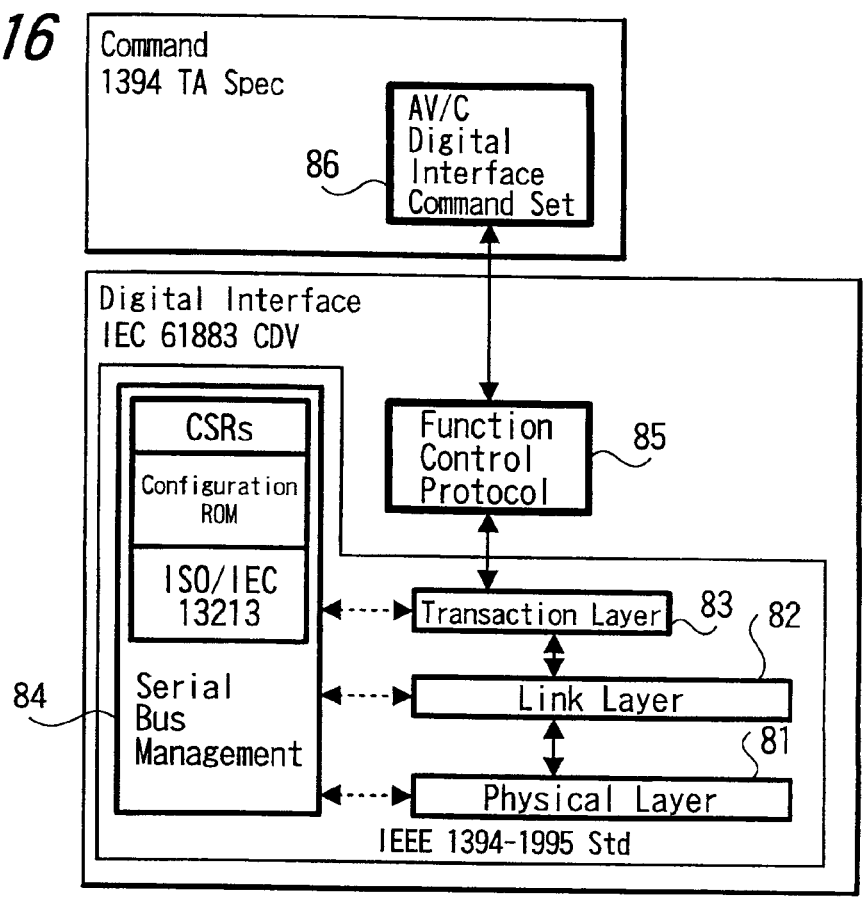
FIG. 16 is a diagram explaining an example of the stack model of an AV/C command.

An AV/C command set used in this embodiment will be described below with reference to FIGS. 16 to 21. FIG. 16 shows a stack model of the AV/C command set. As shown in FIG. 16, a physical layer 81, a link layer 82, a transaction layer 83, and a serial bus management 84 conform to the IEEE 1394 standard. An FCP (Function Control Protocol) 85 conforms to the IEC 61883 standard. An AV/C command set 86 conforms to AV/C Digital Interface Command Set General Specification.

Figure 17:
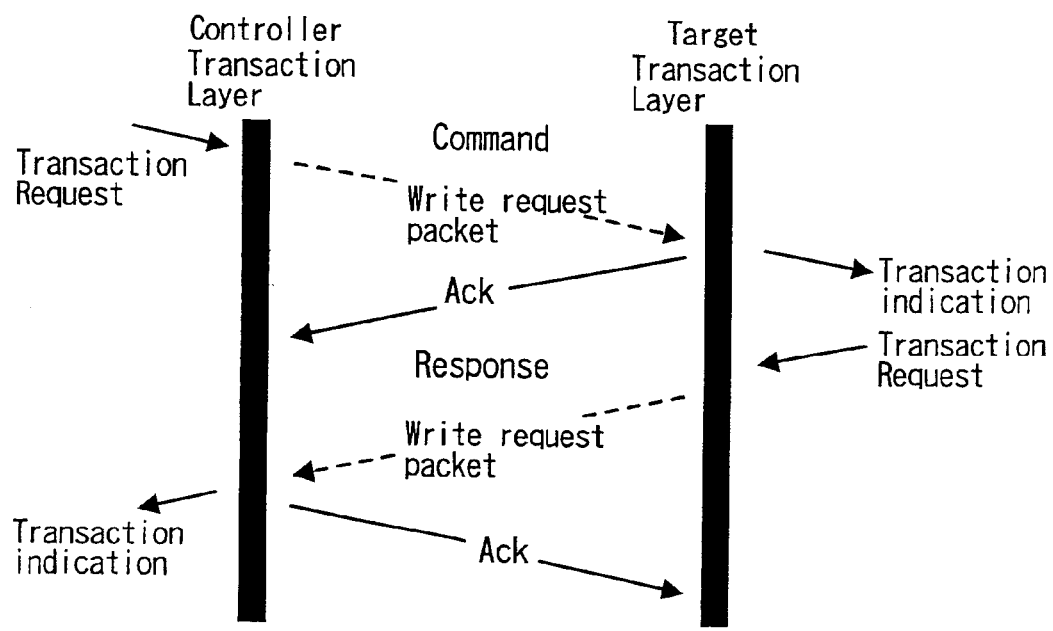
FIG. 17 is a diagram explaining the relationship between a command and a response of an FCP.

FIG. 17 is a diagram explaining a command and a response of the FCP (Function Control Protocol) 85 in FIG. 16.

FCP is a protocol for controlling an AV device on an IEEE 1394 bus. As shown in FIG. 17, a controller controls a target, and the target is controlled by the controller. Transmission of the command or the response of the FCP is performed between nodes by using light transaction of IEEE 1394 asynchronous communication. The target which receives data returns an acknowledge to the controller confirming reception.

Figure 18:
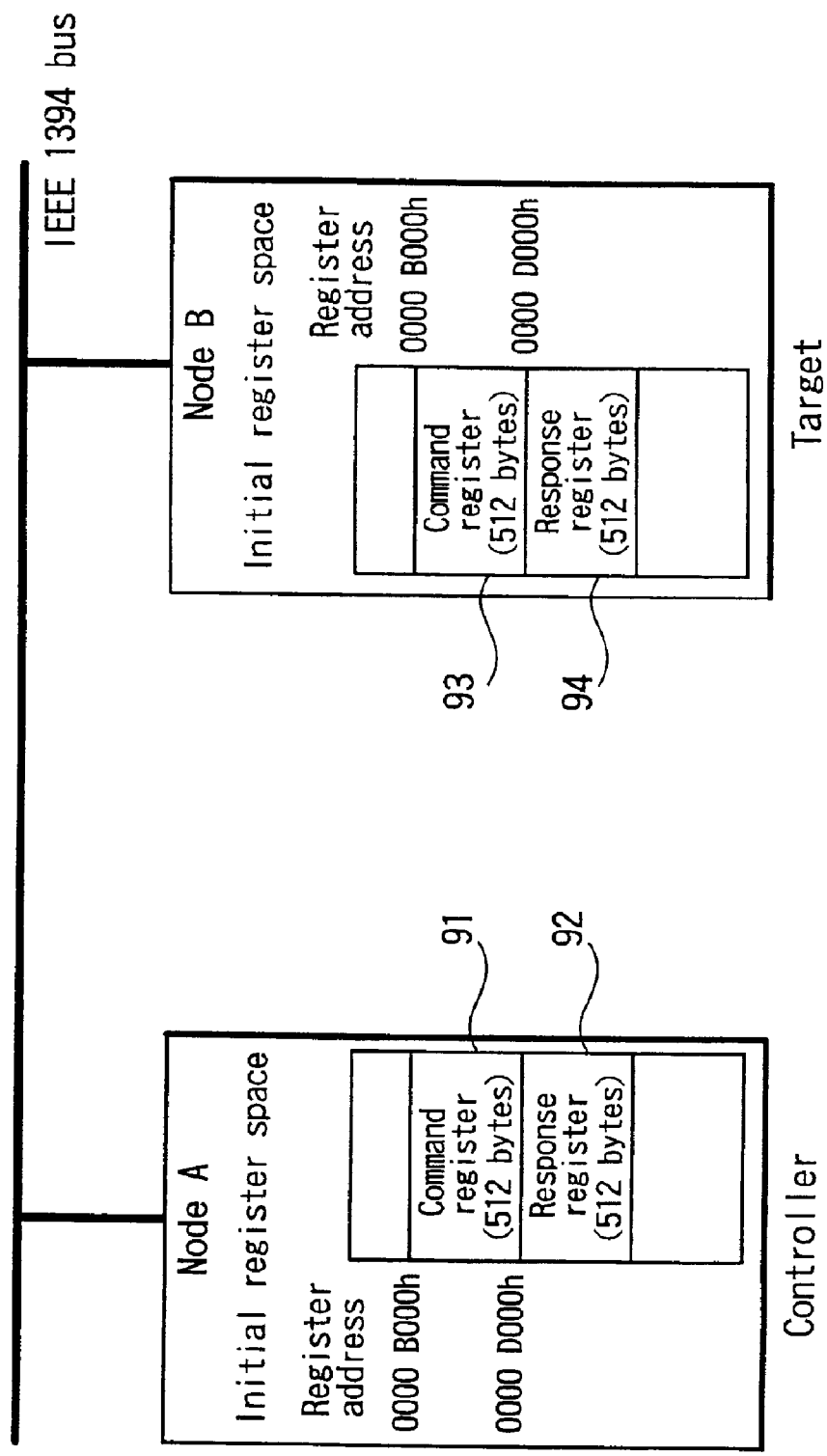
FIG. 18 is a diagram explaining the relationship between the command and the response in FIG. 17 in detail.

FIG. 18 is a diagram explaining in more detail the relationship between the command and the response of the FCP shown in FIG. 17. A node A and a node B are connected to each other through an IEEE 1394 bus. The node A is a controller, and the node B is a target. Each of the nodes A and B have a 512-byte command register and a 512-byte response register. As shown in FIG. 18, the controller writes a command message in a command register 93 of the target to transmit an instruction. In contrast to this, the target writes a response message in a response register 92 of the controller to transmit a response. For the two messages, control information is exchanged. The type of a command set transmitted by the FCP is described in a CTS (ID of the command set) in a data field in FIG. 19 (to be described later).

Figure 19:
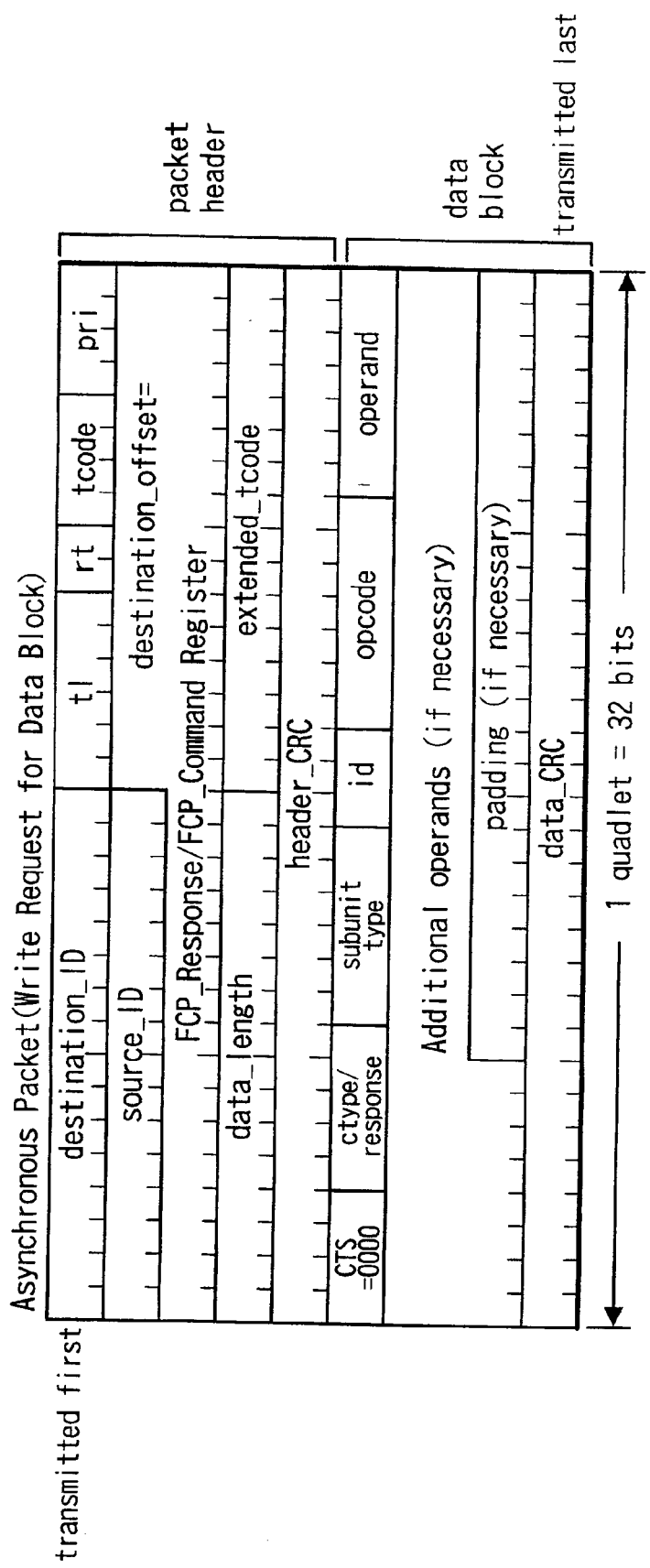
FIG. 19 is a diagram explaining an example of the data structure of an AV/C command.

FIG. 19 shows the data structure of a packet transmitted in an asynchronous transfer mode of an AV/C command. The AV/C command set is a command set for controlling an AV device, and has a CTS (ID of the command set)="0000". An AV/C command frame and a response frame are exchanged between nodes using the FCP. In order to reduce a load on the bus and the AV device, a response to the command must be performed within 100 ms. As shown in FIG. 19, the data of an asynchronous packet comprises 32 bits (1 quadlet) in the horizontal direction. The upper half in FIG. 19 shows the header portion of the packet, and the lower half shows a data block. A destination ID represents a destination.

The CTS represents the ID of a command set, and is satisfied with CTS="0000" in the AV/C command set. The ctype/response field represents a function classification when the packet is a command, and represents a process result of the command when the packet is a response. Commands are roughly classified into four types, that is, (1) a command (CONTROL) for controlling a function from the outside, (2) a command (STATUS) for inquiring about a state from the outside, (3) a command (GENERAL INQUIRY (the presence/absence of support of opcode) and SPECIFIC INQUIRY (the presence/absence of support of opcode and operands), and (4) a command (NOTIFY) for requiring notification of a change in state to the outside.

A response is returned depending on the type of a command. Responses to a CONTROL command may be NOT IMPLEMENTED (not implemented), ACCEPTED (accepted), REJECTED (rejection), and INTERIM (interim). Responses to a STATUS command may be NOT IMPLEMENTED, REJECTED, IN TRANSITION (transition is being performed), and STABLE (stability). Responses to a GENERAL INQUIRY command and SPECIFIC INQUIRY command may be IMPLEMENTED (implemented) and NOT IMPLEMENTED. Responses to a NOTIFY command may be NOT IMPLEMENTED, REJECTED, INTERIM, and CHANGED (changed).

A subunit type is set to specify a function in the device. For example, a tape recorder/player, a tuner, or the like may be allocated as the subunit type. When a plurality of subunits of the same type exist, addressing is performed by a subunit id as a discrimination number. Opcode represents a command, and operand represents a parameter of the command. Additional operands are fields and indicate a field added as needed. Padding indicates a field added as needed. Data CRC (Cyclic Redundancy Check) is used for error check in data transmission.

FIGS. 20A to 20C show examples of the AV/C command. FIG. 20A shows an example of a ctype/response.

The upper half in FIG. 20A represents a command, and the lower half in FIG. 20A represents a response. CONTROL is allocated to "0000", STATUS is allocated to "0001", SPECIFIC INQUIRY is allocated to "0010", NOTIFY is allocated to "0011", GENERAL INQUIRY is allocated to "0100". "0101 to 0111" are reserved and secured for future specification. NOT IMPLEMENTED is allocated to "1000", ACCEPTED is allocated to "1001", REJECTED is allocated to "1010", IN TRANSITION is allocated to "1011", IMPLEMENTED/STABLE is allocated to "1100", CHANGED is allocated to "1101", and INTERIM is allocated to "1111". "1110" is reserved and secured for future specification.

FIG. 20B shows an example of a subunit type. Video Monitor is allocated to "00000", Disk recorder/Player is allocated to "00011", Tape recorder/Player is allocated to "00100", Tuner is allocated to "00101", Video Camera is allocated to "00111", Vender unique is allocated to "11100", Subunit type extended to next byte is allocated to "11110".

Although a unit is allocated to "11111", this is used when the device itself is on, for example, through an ON/OFF operation of a power supply.

FIG. 20C shows an example of an opcode. Tables of an opcode exist for subunit types, respectively. Here, FIG. 20C shows an opcode obtained when the subunit type is a Tape recorder/Player. An Operand is defined for every opcode. In this case, VENDER-DEPENDENT is allocated to "00h", SEARCH MODE is allocated to "50h", TIMECODE is allocated to "51h", ATN is allocated to "52h", OPEN MIC is allocated to "60h", READ MIC is allocated to "61h", WHITE MIC is allocated to "62h", LOAD MEDIUM is allocated to "C1h", RECORD is allocated to "C2h", PLAY is allocated to "C3h", and WIND is allocated to "C4h".

FIGS. 21A and 21B show examples of an AV/C command and a response. For example, when a reproducing device serving as a target (consumer) is instructed to play the controller sends a command shown in FIG. 21A to the target.

Since this command uses an AV/C command set, CTS= "0000" is satisfied. Since a command (CONTROL) for controlling the device from the outside is used for ctype, ctype="0000" is satisfied (see FIG. 20A). Since the subunit type is a Tape recorder/Player, subunit type="00100" is satisfied (see FIG. 20B). An id represents that ID is 0, and id=000 is satisfied.

An ppcode of "C3h" means play (FIG. 20C). An operand of "75h" means FORWARD. When data is reproduced, the target returns a response to the controller as shown in FIG. 21B. In this case, ACCEPTED means acceptance is set in the response, and response="1001" is satisfied (see FIG. 20A). Since FIG. 21B is the same as FIG. 21A except for the response, a separate description of the remainder of FIG. 21B is not necessary.

In this embodiment, a process for controlling the states of devices in communication with one another and connected to each other through the IEEE 1394 bus line will be described below. As has been described with reference to FIGS. 9 and 10, in this embodiment, a PCR plug regulated by the standards of IEC 61883 is set in a register. When the plug performs isochronous communication, a connection to another device is set. In this case, the states of use of the plugs are represented by on-line data for the output plug oPCR shown in FIG. 10B and the input plug iPCR shown in FIG. 10D. An on-line state or an off-line state is determined on the basis of the on-line data, so that the device control unit controls the power supplies of the communication process block and the peripheral circuit thereof.

A case in which the plug of the device is in an on-line state and a case in which the plug of the device is in an off-line state will be described below with reference to FIG. 22.

When a connection is or is not extended to the corresponding plug, the on-line state and the off-line state exist, respectively. More specifically, when a connection is extended to the corresponding plug to set an on-line state, an active state is set in which an isochronous packet can be output or input. When a connection is extended to the corresponding plug to set an off-line state, a suspended state is set in which the device is on standby to output or input an isochronous packet. In addition, when no connection is extended to the corresponding plug to set an on-line state, a ready state is set in which the isochronous packet cannot be output or input. When no connection is extended to set an off-line state, an idle state is set in which communication cannot be performed. When data is written in a register of the plug, a change is performed between the on-line state and the off-line state, and a change is performed between a state in which a connection is extended and a state in which no connection is extended.

Figure 22:
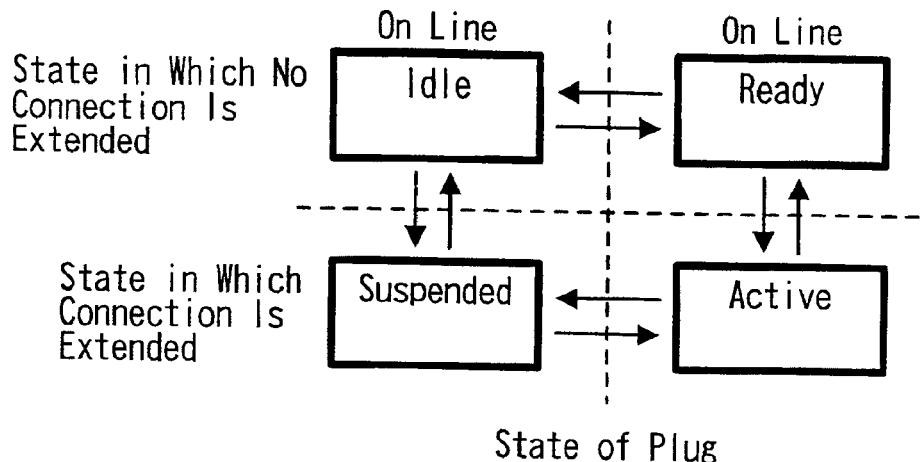
FIG. 22 is a diagram explaining an example of the relationship between a state of a plug and a connection.

As is apparent from FIG. 22, an isochronous packet is actually input or output in only an on-line state. In this embodiment, in the off-line state, power is not supplied to a circuit for performing isochronous communication. More specifically, the control unit 120 determines the settings of the plugs of the register 107 in the communication processing block 100 shown in FIG. 3. When it is determined that all of the plugs for the isochronous communication are in off-line states, a power supply from the power supply circuit 140 to the isochronous block 110 is stopped, so that a power-off state is set. Power is always supplied to the other circuits in the communication processing block 100 while the device containing the communication processing block 100 operates to set a state in which asynchronous communication can be performed.

The on-line and off-line states are designed to be set by the power supply mode of the device containing the communication processing block 100. For example, as shown in Table 1 below, when the power supply of the device is set in an ON state by operating the power supply key in the operation key pad 150, all of the oPCR and iPCR in the device are set in on-line states. When the device is set in a standby state by operating the power supply key in the operation key pad 150, all of the oPCR and iPCR in the device are set in off-line states. In the on-line state, an ON state is set for supplying power to the isochronous communication process unit. In the off-line state, an OFF state is set for stopping the power supply to the isochronous communication process unit.

TABLE 1

| Mode of Power Supply Device | Power Supply of Isochronous Communication Process Unit | State of PCR |
| --- | --- | --- |
| Standby | OFF | Off-line |
| ON | ON | On-line |

In addition to directly controlling the power supply with the key pad of the device, the power-on and standby states can be controlled by transmitting the AV/C command from another device.

Figure 23:
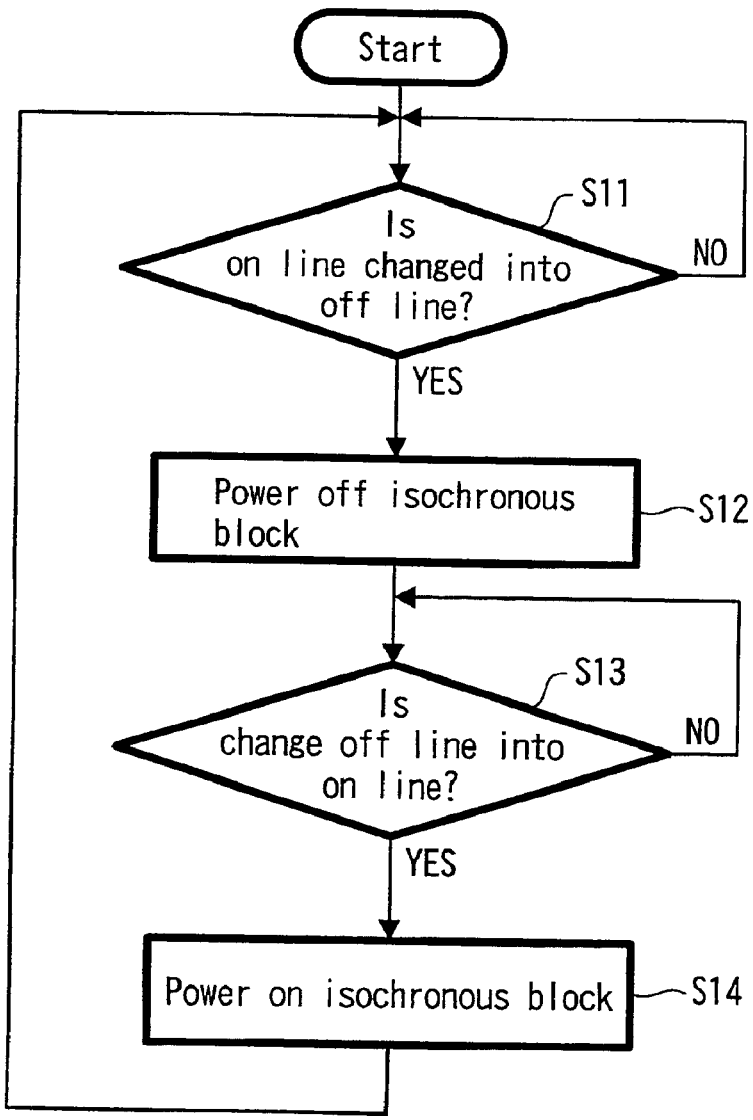
FIG. 23 is a flow chart showing an example of a power supply control process of an isochronous block.

The flow chart in FIG. 23 shows an example of the process in which the control unit 120 determines the settings of the plugs of register 107 to perform power supply control of the isochronous block. This process will be described below. In this example, it is assumed, as an initial state, that the power supply of the isochronous block is set in an ON state.

The control unit 120 checks whether the states of the plugs in the register 107 are changed from the on-line states to the off-line states (step S11). If the states are not changed, the control unit 120 is on standby. If a change from the on-line states to the off-line states is detected, a power-off state is set stopping the power supply from the power supply circuit 140 to the isochronous block 110 (step S12).

After the power-off state is set, the states of the plugs in the register 107 are checked to determine whether there is a change from the off-line states to the on-line states (step S13). If the states are not changed, the control unit 120 is on standby. If a change from the off-line states to the on-line states is detected, a power-on state is set starting the power supply from the power supply circuit 140 to the isochronous block 110 (step S14). Thereafter, the flow returns to the decision in step S11.

In this manner, on the basis of the settings of the on-line and off-line states of the plugs for isochronous communication, the power supply is controlled for performing signal processing for isochronous communication. For this reason, during a period of time in which isochronous communication need not be performed, the power supply for performing isochronous communication can be turned off, so that power consumption of the communication circuit is reduced. In this case, since power is always supplied to the portion of the communication circuit for performing signal processing for isochronous communication to set the operation state, the device can always asynchronously communicate with another device. On the network configuration, the corresponding device (node) remains connected to the bus line. Bus reset or the like does not occur, adding a node ID caused by the bus reset is not performed, and a controller on the network need not frequently perform the bus reset. For this reason, the control process of the network is simplified.

When the power supply of the signal processing unit for isochronous communication is turned off, the device can asynchronously communicate with another device. For this reason, an instruction is transmitted to turn on the power supply of the signal processing unit of the device for isochronous communication such that the AV/C command, and the corresponding process, or the like from another device by asynchronous communication can also be performed. Even though the power supply of the isochronous block is in an OFF state, there is power to transmit stream data from another device.

Figure 24:
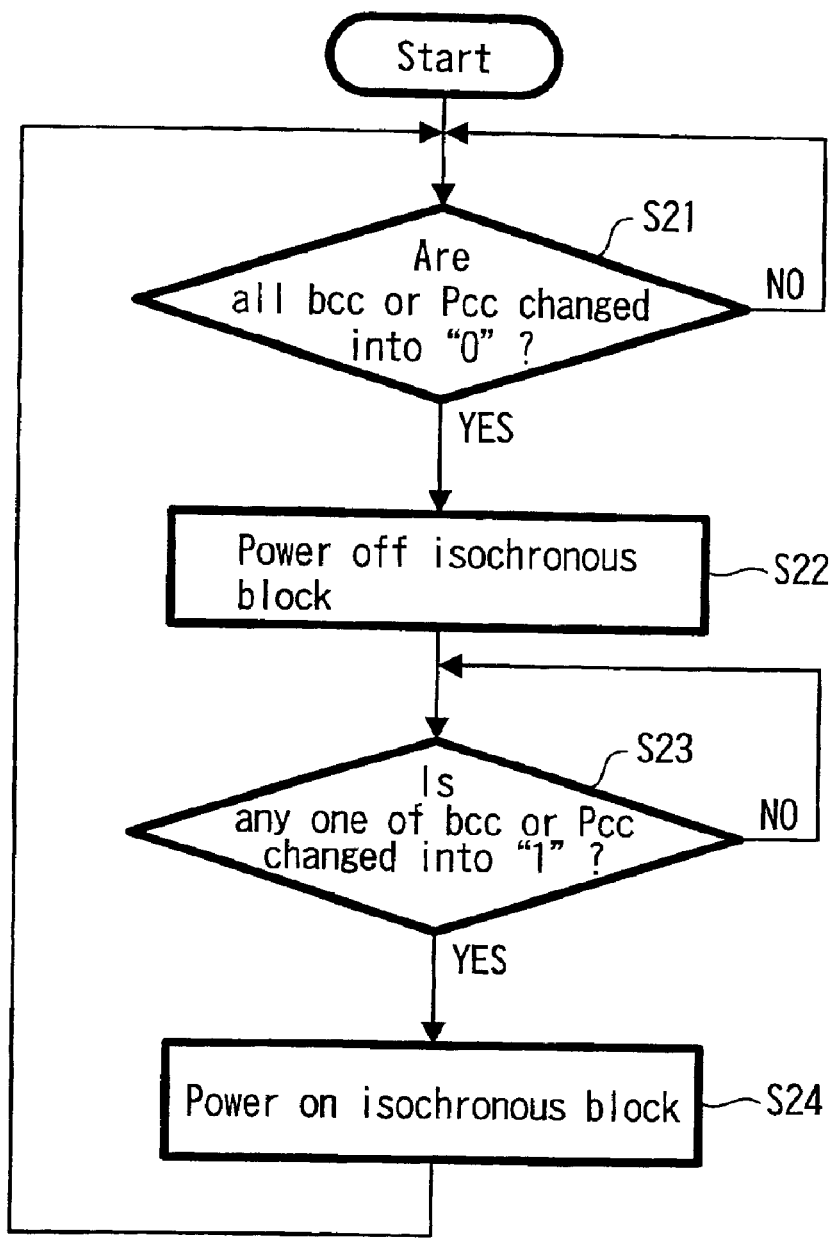
FIG. 24 is a flow chart showing another example of the power supply control process of an isochronous block.

In the process shown in FIG. 23, on the basis of detection of the on-line and off-line states of the plugs, the power supply of the isochronous block is controlled independently of another block. However, on the basis of detection of other states, the power supply of the isochronous block may be independent of another block. The flow chart in FIG. 24 shows another example. In this example, in the output plug oPCR shown in FIG. 10B and the input plug iPCR shown in FIG. 10D, the states of the connections are decided on the basis of a value of a broadcast connection counter (bcc) and the value of a point-to-point connection counter (pcc).

When it is decided that the state of all bcc or pcc are changed, the power supply is turned off.

More specifically, as shown in FIG. 24, if the power supply of the isochronous block is initially in an ON state, the control unit 120 detects the states of the plugs in the register 107 and decides whether the values of the bcc and the pcc of all of the plugs are changed to 0 (step S21). When the values are not changed to 0, the control unit 120 is on standby.

When it is detected that the values of the bcc and the pcc of all of the plugs are 0, the power supply from the power supply circuit 140 to the isochronous block 110 is stopped to set a power-off state (step S22).

After the power-off state is set, the states of the plugs in the register 107 are detected, and it is decided whether any one of the bits of the bcc or the pcc of any one of the plugs is changed to 1 (step S23). When the value is not changed, the control unit 120 is on standby. When it is detected that any one of the bits of the bcc or the pcc of any one of the plugs is 1, the power supply from the power supply circuit 140 to the isochronous block 110 is started to set a power-on state (step S24). Thereafter, the flow returns to the decision in step S21.

When the process is performed as described above in the case of the flow chart in FIG. 23, the presence/absence of isochronous communication is reliably decided to control the ON or OFF state of the power supply of the isochronous block. When the isochronous communication need not be performed, the power supply of the block for performing the communication process is turned off, so that the power consumption of the communication circuit is reduced.

In the flow charts in FIGS. 23 and 24, the state is decided of the plugs for isochronous communication. When the isochronous communication need not be performed, the power supply is turned off for the block for the isochronous communication process. However, the power supply of the block for the isochronous communication process can be independently controlled depending on the operation state of the power supply key of the device. More specifically, when a power-on state is set for the device (that is, the device is set in an operation state), both the power supply of the isochronous communication process block and the power supply of the asynchronous communication process block are turned on to a standby state (that is, only the control unit of the device is in an operation state). The power supply for the isochronous communication process block may be turned off, and only the power supply of the asynchronous communication process block may be kept in an ON state. In this case, a power-off state can be set independently of a standby state, so that both power supplies, that is, the power supply for the isochronous communication process block and the power supply for the asynchronous communication process block can be turned off.

In the embodiment described above, power supply control is performed only in the block for directly performing a communication process. However, power supply control for a circuit block dependent on the format of stream data for performing a transmission or a reception process in the block also may be performed while being linked with the power supply control for the isochronous block.

For example, when the power supply is turned off for the isochronous communication block in the disk recording/reproducing device 50, the power supplies may be turned off for the block performing a data recording process in the ATRAC system and for the block performing a data reproducing process in the ATRAC system to transmit the data to the isochronous communication block.

In addition, for example, when the power supply in the IRD 10 for the isochronous communication block is in an OFF state, the portion of the block that performs a process in which video data of the MPEG system is received is in a power-off state, so that a process may not be performed for receiving the video data or the like that is stream data output from the isochronous communication block. In this manner, power consumption of the device is further reduced.

In the embodiment described above, the power supply of the isochronous communication block is controlled on the basis of the state of a register in the communication process block. However, the power supply of the isochronous communication block may be automatically controlled when the power supply is linked to any state of the device. For example, in a device using a recording medium such as the disk recording/reproducing device 50, the power supply of the isochronous communication block may be controlled when the power supply is linked to the loading of a recording medium (disk) in the device. More specifically, when there is no recording medium loaded in the device, stream data does not need to be input to or output by the device, and the control unit sets the power supply of the isochronous communication block to an off state. When the recording medium is loaded, data can be recorded or reproduced by the device.

For this reason, the control unit may set the power supply of the isochronous communication block in an ON state. In this manner, on the basis of the state of the device, the power supply of the isochronous communication block can be appropriately controlled. The disk recording/reproducing device 50 of this embodiment is a recording device for audio data.

Similarly, when a recording/reproducing device is used for recording video data or the like on a medium (disk, tape, memory card, or the like) and reproducing the video data, the power supply of the isochronous communication process unit may be controlled when the power supply is linked to the presence/absence of a loaded medium.

In the embodiment described above having a device containing the communication processing block 100 shown in FIG. 3, the IRD 10 and the disk recording/reproducing device 50 are described. However, the present invention also can be applied in an embodiment having a similar communication process block built in another device and connected to the bus line to perform synchronous and asynchronous communication.

In the embodiment described above, the power supply to the block that performs an isochronous communication process is controlled independently from the block that performs another communication process. However, the power supply of the block that performs the asynchronous communication process may be controlled independently of the block that performs the other communication process. More specifically, for example, the power supply of the asynchronous signal processing unit 106 and the power supply of the asynchronous data buffer 105 in the communication processing block 100 shown in FIG. 3 are designed to be controlled independently of the other circuits in the communication processing block 100. When the control unit 120 decides that asynchronous communication need not be performed, the power supply is stopped to the asynchronous signal processing unit 106 and the asynchronous data buffer 105.

In the state during which asynchronous communication does not need to be performed, a monitoring video camera is used as a device having the communication process block 100, and the monitoring video camera is in a constant state that continuously executes video data. The process of continuously transmitting video data to a recording device or a monitor is performed in an isochronous communication mode. It is assumed that a command for controlling the video camera does not need to be transmitted during asynchronous communication.

In such a case, when the power supply is off for the block that processes asynchronous communication, the isochronous communication process is performed using a small power consumption, and monitoring can be continuously performed in a constant state. Even though a device is used, except for the monitoring camera, when there must be continuous transmission of serial stream data in a constant state, only the block for processing the asynchronous communication may be independently controlled.

In the embodiment described above, a network comprising an IEEE 1394 bus has been described. However, the present invention can also be applied in an embodiment in which the same data transmission is performed between devices connected through another network configuration (for example, USB). In addition to the bus line described above, the transmission path between the devices may be a wireless transmission path. With the wireless transmission path, when a network comprises a plurality of devices connected by a wireless communication standard called, for example, Bluetooth, the power supply of at least one of the blocks for performing a synchronous or an asynchronous communication process can be independently controlled by the devices in the network.

According to a control method described in a first aspect of the present invention, the power supply is independently controlled for the portion of the circuit that executes the communication process in the synchronous communication mode. For example, when synchronous communication does not need to be performed, the power supply for that portion can be turned off. Therefore, power may be supplied to the portion that executes the communication process in the synchronous mode only when synchronous communication must be performed, so that the power required for the communication process is reduced.

According to a control method described in a second aspect of the present invention, in the embodiment described in the first aspect, the power supply is turned off for the portion of the circuit that executes the communication process in the synchronous communication mode during the period in which communication is not executed in the synchronous communication mode, and during which the power supply is turned on for the portion of the circuit that executes the communication process in an asynchronous communication mode. For this reason, the power supply of the communication process unit in the asynchronous communication mode is turned on in a period when communication in the synchronous communication mode is not performed, and the power required for the communication process is reduced.

According to a control method according to a third aspect of the present invention, in the embodiment described in the second aspect, the power supply also is turned off for the portion of the circuit that performs a process dependent on the format of data communicated in the synchronous communication mode, so that power consumption is reduced.

According to a control method according to a fourth aspect of the present invention, in the embodiment described in the first aspect, the network uses a bus line to connect devices in which communication in the asynchronous communication mode and communication in the synchronous communication mode can coexist on the same line using time division. For this reason, the power required is effectively reduced for communication between the devices when communication is executed using the network connections performed by the bus line having the above configuration.

According to the control method described in a fifth aspect of the present invention, in the embodiment described in the fourth aspect, when the setting of a plug for the synchronous communication mode is in an OFF state, the power supply is turned off for the portion of the circuit that executes the communication process in the synchronous communication mode. For this reason, the power supply can be preferably controlled for the portion of the circuit that executes the communication process in the synchronous communication mode.

According to a seventh aspect of the present invention, in the embodiment described in the fourth aspect, when a connection is not set for synchronous communication with another device in the network the power supply is turned off for the portion of the circuit that executes the communication process in a synchronous communication mode. For this reason, the power supply can be preferably controlled for the portion of the circuit that executes the communication process in the synchronous communication mode.

According to a control method described in a ninth aspect of the present invention, in the embodiment described in the first aspect, when the recording medium is not loaded, the power supply is turned off for the portion of the circuit that executes the communication process in the synchronous communication mode, and, when the recording medium is loaded, the power supply is turned on for the portion of the circuit that executes the communication process in the synchronous communication mode.

For this reason, the power supply of the communication process unit in the synchronous communication mode is ON/OFF-controlled when the power supply is linked to the loading/unloading of the recording medium. For example, when data that is read from the recording medium is transmitted to the network in the synchronous communication mode, or when data that is received in the synchronous communication mode through the network is recorded on the recording medium, if these processes cannot be executed, the power supply is automatically turned off for the communication process unit in the synchronous communication mode, and the power supply can be preferably controlled for the communication process unit in the synchronous communication mode in accordance with the state of the device.

According to a control method described in an eleventh aspect of the present invention, the power supply is independently controlled for the portion of the circuit that supply executes a communication process in an asynchronous communication mode and, for example, when asynchronous communication does not need to be performed, the power supply for that portion can be turned off. Therefore, power may be supplied to the portion that executes the communication process in the asynchronous communication mode only when the asynchronous communication must be performed, so that the power required for the communication process is reduced.

According to a control method described in a twelfth aspect of the present invention, in the embodiment described in the eleventh aspect, communication is continuously executed in the synchronous communication mode and, when communication in the asynchronous communication mode does not need to be performed, the power supply is turned off for the portion of the circuit that executes the communication process in the asynchronous communication mode. For example, as in transmission or the like in the asynchronous communication mode of video data from a monitoring camera, continuous data communication is performed in a constant state, and, when control data or the like related to the data communication in the asynchronous communication mode does not need to be performed, a communication process can be performed with a small power consumption.

According to a communication device described in a thirteenth aspect of the present invention, the power supply of a first communication process unit that executes a communication process in a synchronous communication mode can be independently controlled. For example, when synchronous communication does not need to be performed, the power supply can be turned off for the first communication process unit. For this reason, in accordance with a communication state decided by a control unit, the power can be turned off for the first communication process unit to reduce power consumption.

According to a communication device described in a fourteenth aspect of the present invention, in the embodiment described in the thirteenth aspect, during a period in which communication is not executed in the synchronous communication mode, the control unit turns off the power supply of the first communication process unit, and the power supplies are set in ON states for a second communication process unit and an input/output unit. For this reason, the second communication process unit is powered on during the period in which the communication in the synchronous communication mode is not performed, and the power required for the communication process is reduced.

According to a communication device described in a fifteenth aspect of the present invention, in the embodiment described in the fourteenth aspect, a data processing unit performs a process dependent on a format of data communicated in the synchronous communication mode, and the control unit turns off the power supply of the data processing unit during the period in which communication in the synchronous communication mode is not executed. For this reason, power consumption is reduced.

According to a communication device described in a sixteenth aspect of the present invention, in the embodiment described in the thirteenth aspect, an input/output unit is connected to a network by a bus line. Communication on the same line in such a network in an asynchronous or synchronous communication mode can coexist using time division.

For this reason, the power required is effectively reduced for communication between communication devices in the network where the connections to the network are performed by the bus line having the above configuration.

According to a communication device described in a eighteenth aspect of the present invention, in the embodiment described in the sixteenth aspect, when the control unit decides that a plug for the synchronous communication mode is set in an OFF state, the control unit turns off the power supply of the first communication unit. For this reason, the power supply can be preferably controlled for the first communication unit that executes the communication process in the synchronous communication mode.

According to a communication device described in a twentieth aspect of the present invention, in the embodiment described in the sixteenth aspect, when the control unit decides that a connection is not set for synchronous communication with another device in the network, the control unit turns off the power supply of the first communication unit. For this reason, the power supply can be preferably controlled for the first communication unit that executes the communication process in the synchronous communication mode.

According to a communication device described in a twenty-first aspect of the present invention, in the embodiment described in the thirteenth aspect, when the control unit detects removal of the recording medium from a loading unit, the control unit turns off the power supply of the first communication process unit. The control unit turns on the power supply of the first communication process unit when the control unit detects loading of the recording medium in the loading unit. For this reason, the power supply of the first communication process unit is automatically ON/OFF-controlled when the power supply is linked to loading/unloading of the recording medium. For example, when data that is read from the recording medium is transmitted to the network in the synchronous communication mode, or when data that is received in the synchronous communication mode through the network is recorded on the recording medium, if these processes cannot be executed, the power supply is automatically turned off for the communication process unit in the synchronous communication mode.

Therefore, the power supply for the communication process unit in the synchronous communication unit is preferably controlled in accordance with a state of the device.

According to a control device described in a twenty-second aspect of the present invention, a control unit is used to independently control a power supply of a second communication process unit for executing a communication process in an asynchronous communication mode. For example, when asynchronous communication does not need to be performed, the power supply of the second communication process unit can be turned off. Therefore, in accordance with the state of communication determined by the control unit, the power supply of the second communication unit can be turned off to reduce power consumption.

According to a communication device described in a twenty-third aspect of the present invention, in the embodiment described in the twenty-second aspect, communication in the synchronous communication mode is continuously executed by the first communication process unit, and, when the second communication process unit does not need to perform communication in an asynchronous communication mode, the control unit turns off the power supply of the second communication process unit. For this reason, for example, as in transmission or the like of video data from a monitoring camera in the synchronous communication mode, continuous data communication is performed in a constant state. Control data or the like related to the data communication does not need to be transmitted in the asynchronous communication mode, and the communication process can be performed with less power consumption.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A method for controlling power supplies of a device connected to a predetermined network, said device having a first communication process unit for executing communication in an asynchronous communication mode and having a second communication process unit for executing communication in a synchronous communication mode, the method comprising:
   controlling a first power supply of the second communication process unit for executing a communication process in the synchronous communication mode; and
   controlling a second power supply of the first communication process unit for executing a communication process in the asynchronous communication mode, said first power supply being controlled independently of said second power supply.

2. The control method according to claim 1, wherein said first power supply is turned off during a period in which communication in the synchronous communication mode is not executed, and said second power supply is turned on during said period.

3. The control method according to claim 2, wherein said first power supply is turned off when a process is performed dependent on a format of data communicated in the synchronous communication mode.

4. The control method according to claim 1, wherein the predetermined network includes a bus line on which first communication data in the asynchronous communication mode and second communication data in the synchronous communication mode are transmitted, and said first and second communication data coexist on said bus line using time division.

5. The control method according to claim 4, wherein said first power supply is controlled on the basis of a setting of a plug for the synchronous communication mode.

6. The control method according to claim 5, wherein said first power supply is turned off when said setting of said plug is in an off state.

7. The control method according to claim 4, wherein said first power supply is controlled on the basis of a state of a connection with another device in said network for synchronous communication.

8. The control method according to claim 7, wherein said first power supply is turned off when said connection with said another device is not made.

9. The control method according to claim 1, wherein said device has a loading unit operable to load a recording medium, and said first power supply is controlled on the basis of a loading state of said recording medium in said loading unit.

10. The control method according to claim 9, wherein said first power supply is turned off when said recording medium is removed from said loading unit; and
   said first power supply is turned on when said recording medium is loaded in said loading unit.

11. A method for controlling power supplies of a device connected to a predetermined network, said device having a first communication process unit for executing communication in a synchronous communication mode and having a second communication process unit for executing communication in an asynchronous communication mode, the method comprising:
   controlling a first power supply of the second communication process unit for executing a communication process in the asynchronous communication mode; and
   controlling a second power supply of the first communication process unit for executing a communication process in the synchronous communication mode, said first power supply being controlled independently of said second power supply.

12. The control method according to claim 11, wherein communication in the synchronous communication mode is continuously executed, and said first power supply is turned off when communication in the asynchronous communication mode is not performed.

13. A communication device which is connected to a predetermined network, said device performing synchronous communication in a synchronous communication mode through the network and asynchronous communication in an asynchronous communication mode through the network, said device comprising:
   a first communication process unit for performing a first communication process in said synchronous communication mode;
   a second communication process unit for performing a second communication process in said asynchronous communication mode;
   an input and output unit for performing inputting and outputting between said first and said second communication process units and the network; and
   a control unit for controlling said synchronous communication and said asynchronous communication by independently controlling a power supply of said first communication process unit.

14. The communication device according to claim 13, wherein said control unit turns off said power supply during a period in which communication is not executed in said synchronous communication mode, and said control unit sets a power supply of said second communication process unit in an on state during said period.

15. The communication device according to claim 14, further comprising:
   a data processing unit for performing a process dependent on a format of data communicated in said synchronous communication mode; and
   said control unit turns off a power supply of said data processing unit during said period in which communication is not executed in said synchronous communication mode.

16. The communication device according to claim 13, wherein, on the network, said asynchronous communication mode transmits asynchronous communication data and said synchronous communication mode transmits synchronous communication data, and using time division, said asynchronous communication data and said synchronous communication data coexist on a common bus line.

17. The communication device according to claim 16, wherein said control unit turns off said power supply of said first communication control unit on the basis of a setting of a plug for said synchronous communication mode.

18. The communication device according to claim 17, wherein said control unit turns off said power supply of said first communication process unit when said control unit determines that a setting of said plug for said synchronous communication mode is in an off state.

19. The communication device according to claim 16, wherein said control unit turns off said power supply of said first communication process unit on the basis of a state of a connection with another device in the network for synchronous communication.

20. The communication device according to claim 19, wherein said control unit turns off said power supply of said first communication control unit when said control unit determines that said connection with said another device is not made.

21. The communication device according to claim 13, further comprising:

a loading unit for loading a recording medium; and a loading detection unit for detecting a loaded condition in which a recording medium is loaded in said loading unit and an unloaded condition in which said recording medium is not loaded in said loading unit, and when said loading detection unit detects said unloaded condition, said control unit turns off said power supply of said first communication process unit, and when said loading detection unit detects said loaded condition, said control unit turns on said power supply of said first communication process unit.

22. A communication device which is connected to a predetermined network, said device performing synchronous communication in a synchronous communication mode through the network and asynchronous communication in an asynchronous communication mode through the network, said device comprising:

a first communication process unit for performing a first communication process in said synchronous communication mode;

a second communication process unit for performing a second communication process in said asynchronous communication mode;

an input and output unit for performing inputting and outputting between said first and said second communication process units and the network; and a control unit for controlling said synchronous communication and said asynchronous communication by independently controlling a power supply of said second communication process unit.

23. The communication device according to claim 22, wherein communication in the synchronous communication mode is continuously executed by said first communication process unit, and, said control unit turns off said power supply of said second communication process unit when communication in said asynchronous communication mode does not need to be performed by said second communication process unit.

* * * * *

UNITED STATES PATENT AND TRADEMARK OFFICE
CERTIFICATE OF CORRECTION

PATENT NO. : 6,928,563 B2
DATED : August 9, 2005
INVENTOR(S) : Junji Kato

It is certified that error appears in the above-identified patent and that said Letters Patent is hereby corrected as shown below:

Column 2,
Line 4, after "communication" insert -- mode --.

Column 6,
Line 48, after "devices" insert -- , --.

Column 7,
Line 28, after "mode" delete ",".

Column 8,
Line 23, after "started" delete "made".

Column 10,
Line 52, after "is" insert -- a --.

Column 13,
Line 44, delete "ppcode" and insert -- opcode --.

Signed and Sealed this

First Day of November, 2005

JON W. DUDAS
*Director of the United States Patent and Trademark Office*